US011270487B1

(12) United States Patent
Steptoe et al.

(10) Patent No.: US 11,270,487 B1
(45) Date of Patent: Mar. 8, 2022

(54) SYSTEMS AND METHODS FOR IMPROVING ANIMATION OF COMPUTER-GENERATED AVATARS

(71) Applicant: Facebook Technologies, LLC, Menlo Park, CA (US)

(72) Inventors: William Arthur Hugh Steptoe, London (GB); Michael Andrew Howard, Redwood City, CA (US); Melinda Ozel, San Francisco, CA (US); Giovanni F. Nakpil, San Francisco, CA (US); Timothy Naylor, Menlo Park, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/574,014

(22) Filed: Sep. 17, 2019

Related U.S. Application Data

(60) Provisional application No. 62/732,562, filed on Sep. 17, 2018.

(51) Int. Cl.
*G06T 7/00* (2017.01)
*G06K 9/00* (2006.01)
(Continued)

(52) U.S. Cl.
CPC .......... *G06T 13/40* (2013.01); *G06K 9/00221* (2013.01); *G06K 9/00362* (2013.01); *G06T 7/20* (2013.01); *G06T 7/97* (2017.01); *G06T 13/20* (2013.01); *G06T 13/80* (2013.01); *G06T 2207/20081* (2013.01); *G06T 2207/30196* (2013.01)

(58) Field of Classification Search
CPC ........ G06T 13/20; G06T 7/97; G06K 9/00221
See application file for complete search history.

(56) References Cited

U.S. PATENT DOCUMENTS

| 2006/0009978 | A1* | 1/2006 | Ma ............................... 704/266 |
| 2017/0213076 | A1* | 7/2017 | Francisco .......... G06K 9/00228 |

(Continued)

OTHER PUBLICATIONS

Amini et al., HapFACS 3.0: FACS-Based Facial Expression Generator for 3D Speaking Virtual Characters, May 13, 2015, IEEE Transactions on Affective Computing, vol. 6, Issue: 4, pp. 348-360 (Year: 2015).*

(Continued)

*Primary Examiner* — Matthew Salvucci
(74) *Attorney, Agent, or Firm* — FisherBroyles, LLP

(57) ABSTRACT

The disclosed computer-implemented method may include identifying a muscle group engaged by a user to execute a predefined body action by (1) capturing a set of images of the user while the user executes the predefined body action, and (2) associating a feature of a body of the user with the muscle group based on the predefined body action and the set of images. The method may also include determining, based on the set of images, a set of parameters associated with the user, the muscle group, and the predefined body action. The method may also include directing a computer-generated avatar that represents the body of the user to produce the predefined body action in accordance with the set of parameters. Various other methods, systems, and computer-readable media are also disclosed.

20 Claims, 11 Drawing Sheets

(51) Int. Cl.
*G06T 13/20* (2011.01)
*G06T 13/40* (2011.01)
*G06T 13/80* (2011.01)
*G06T 7/20* (2017.01)

(56) References Cited

U.S. PATENT DOCUMENTS

2018/0253881 A1 9/2018 Edwards et al.
2021/0104086 A1* 4/2021 Wang .................... G06N 3/084

OTHER PUBLICATIONS

Farnsworth, Bryn, "Facial Action Coding System (FACS)—A Visual Guidebook", URL: https://imotions.com/blog/facial-action-coding-system/, Aug. 18, 2019, 14 pages.
Carnegie Melon University, "FACS—Facial Action Coding System", URL: https://www.cs.cmu.edu/~face/facs.htm, as accessed on Sep. 17, 2019, 5 pages.
Velloso et al., "AutoBAP: Automatic Coding of Body Action and Posture Units from Wearable Sensors", URL: https://www.perceptualui.org/publications/velloso13_acii.pdf, Proc. Humaine Association Conference on Affective Computing and Intelligent Interaction (ACII), 2013, 6 pages.
Dael et al., "The Body Action and Posture Coding System (BAP): Development and Reliability", Journal of Nonverbal Behavior, vol. 36, Jan. 18, 2012, pp. 97-121.
What-when-how, "Facial Expression Recognition (Face Recognition Techniques) Part 1", URL: http://what-when-how.com/face-recognition/facial-expression-recognition-face-recognition-techniques-part-1/, as accessed on Oct. 24, 2018, pp. 1-8.
Wikipedia, "Facial Action Coding System", URL: https://en.wikipedia.org/w/index.php?title=Facial_Action_Coding_System&oldid=910961388, as accessed on Sep. 17, 2019, 11 pages.
Non-Final Office Action received for U.S. Appl. No. 16/574,010 dated Nov. 25, 2020, 22 pages.
Final Office Action received for U.S. Appl. No. 16/574,010 dated May 4, 2021, 48 pages.
Taylor et al., "Dynamic Units of Visual Speech", ACM SIGGRAPH Symposium on Computer Animation, 2012, pp. 275-284.
Beskow, Jonas, "Trainable Articulatory Control Models for Visual Speech Synthesis", International Journal of Speech Technology, vol. 7, 2004, pp. 335-349.
Non-Final Office Action dated Jul. 2, 2021 for U.S. Appl. No. 16/574,014, filed Sep. 17, 2019, 41 Pages.

\* cited by examiner

Table 400

| Viseme | Phonemes | Examples | Visual Example |
|---|---|---|---|
| sil | Neutral | (None - Silence) |  |
| DD | /t/, /d/ | Tip, Doll |  |
| nn | /n/, /l/ | Lot, Not |  |
| RR | /r/ | Red |  |
| E | /e/ | Bed |  |

402 — sil row
404 — DD row
406 — nn row
408 — RR row
410 — E row

Table 500

Example Action Units (Intensity = 1.0)

502 Neutral

504 AU 12: Lip Corner Puller

506 AU 14: Dimpler

508 AU 16: Lower Lip Depressor

510 AU 22: Lip Funneler

Table 600

SYSTEMS AND METHODS FOR IMPROVING ANIMATION OF COMPUTER-GENERATED AVATARS

CROSS REFERENCE TO RELATED APPLICATION

This application claims the benefit of U.S. Provisional Application No. 62/732,562, filed Sep. 17, 2018, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
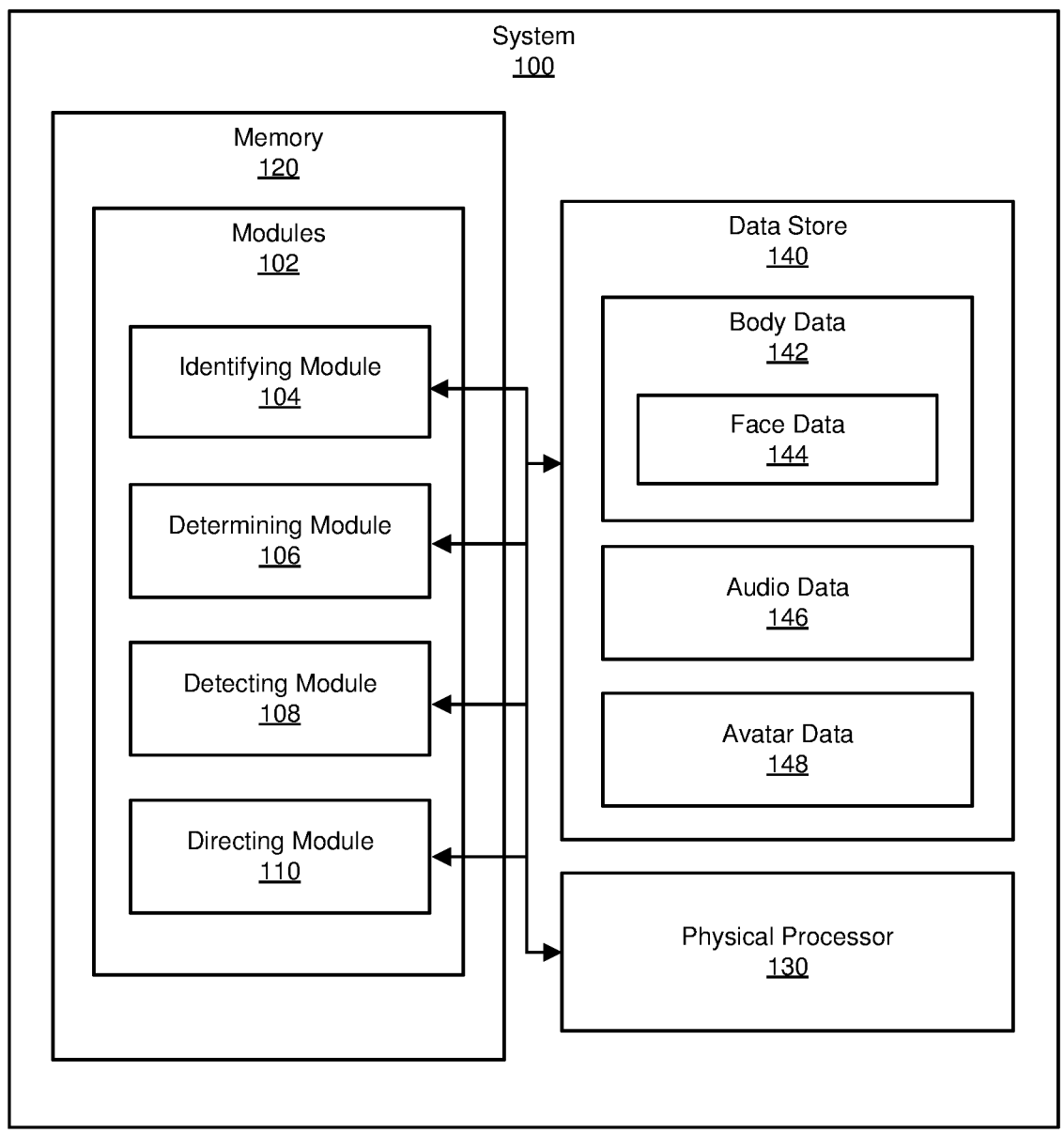
FIG. 1 is a block diagram of an example system for incorporating human physical characteristics into avatar animations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern computing devices provide a myriad of communication options for users to connect with one another. For example, advances in computer graphics and animation techniques have expanded the ways that users may communicate with and interact with each other via computer-generated avatars. Such avatars may represent users in a variety of contexts, such as virtual reality (VR) environments, augmented reality (AR) environments, and/or video conferencing applications.

However, there is a need for improved systems and methods to enhance realism and accuracy of such computer-generated avatars. As one example, achieving real-time rendering of human facial movement, particularly when rendering facial movement associated with human speech, has shown to be an arduous task. A human face may be a composite of multiple muscle groups that may inter-operate in complex ways during human speech. Conventional facial animation systems and methods may be unable to effectively model and/or reproduce these complex interactions in real-time, which may cause such conventional facial animation systems and methods to produce unrealistic and/or inaccurate facial motions.

Hence, the instant application identifies and addresses a need for new and/or improved systems and methods for incorporating human physical characteristics into avatar animations.

The present disclosure is generally directed to systems and methods for incorporating human physical characteristics into avatar animations. As will be explained in greater detail below, embodiments of the instant disclosure may take into account and/or model one or more characteristics of movement of muscle groups as they ease into and/or out of different positions, combinations, or configurations to produce particular body actions, such as particular visemes. This may enable generalized reproduction of human behaviors (e.g., human facial behaviors, human body action behaviors, etc.) by computer-generated avatars (e.g., two-dimensional computer-generated avatars, three-dimensional computer-generated avatars, etc.), which may cause animations (e.g., facial animations, body animations, etc.) of such computer-generated avatars to more accurately reproduce natural movements and/or behaviors.

Additionally, embodiments of the systems and methods described herein may analyze muscle characteristics of individual users and may apply those individualized muscle characteristics to computer-generated avatars. Some embodiments of the systems and methods described herein may employ machine learning techniques to analyze muscle characteristics of individual users in such a way that, with only a small amount of training data, an example system may effectively identify and/or determine individualized muscle characteristics of users. Embodiments of the systems and methods described herein may also apply individualized muscle characteristics to computer-generated avatars. This application of individualized muscle characteristics to computer-generated avatars may be accomplished regardless of topology or geometry of a particular computer-generated avatar, which may be highly differentiated from an actual appearance of a user.

In some examples, the systems and methods described herein may be applied to and/or may improve person-to-person real-time communication scenarios such as avatar-assisted video conferencing and/or voice interactions of users via avatars within artificial environments. For example, an embodiment of the systems and methods described herein may direct a computer-generated avatar that represents a user within an artificial environment, such as a VR and/or AR environment, to accurately and realistically reproduce, in real-time, facial expressions and/or facial motions associated with a series of phonemes produced by the user (e.g., words spoken by the user) and/or body actions executed by the user. This improvement in realism may commensurately improve effectiveness of avatar-assisted real-time communications.

Additionally, embodiments of the instant disclosure may provide for more efficient usage of telecommunications resources (e.g., bandwidth). For example, in a scenario where a user's bandwidth resources may be limited, the user may employ a realistically animated computer-generated avatar such as described herein to augment a low-bandwidth voice conversation with another user rather than engaging in a bandwidth-intensive video conference. Such a use case may provide many of the same benefits of a traditional video conference (e.g., face-to-face communication, ability to perceive some non-verbal cues, etc.), while utilizing significantly fewer bandwidth resources than a traditional video conference. These and other benefits and/or advantages of the disclosed systems and methods may be described in additional detail below.

The following will provide, with reference to FIGS. 1-2, 4-9, and 10, detailed descriptions of systems for incorporating human physical characteristics into avatar animations. Detailed descriptions of corresponding computer-implemented methods will also be provided in connection with FIGS. 3 and 11.

FIG. 1 is a block diagram of an example system 100 ("system 100") for incorporating human physical characteristics into avatar animations. As illustrated in this figure, example system 100 may include one or more modules 102 for performing one or more tasks. As will be explained in greater detail below, Modules 102 may include an identifying module 104 that identifies a set of action units (AUs) associated with a face of a user, each AU associated with at least one muscle group engaged by the user to produce a viseme associated with a sound produced by the user. In some examples, modules 102 may also include a determining module 106 that, for each AU in the set of AUs, determines a set of AU parameters associated with the AU and the viseme, the set of AU parameters that may include (1) an onset curve associated with the viseme, and (2) a falloff curve associated with the viseme.

As further shown in FIG. 1, modules 102 may also include a detecting module 108 that detects that the user has produced the sound, and a directing module 110 that directs a computer-generated avatar that represents the user to produce the viseme in accordance with the set of AU parameters associated with each AU in response to detecting that the user is producing the sound.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate incorporating human physical characteristics into facial avatar animations. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include one or more data stores, such as data store 140, that may receive, store, and/or maintain data. Data store 140 may represent portions of a single data store or computing device or a plurality of data stores or computing devices. In some embodiments, data store 140 may be a logical container for data and may be implemented in various forms (e.g., a database, a file, a file system, a data structure, etc.). Examples of data store 140 may include, without limitation, files, file systems, data stores, databases, and/or database management systems such as an operational data store (ODS), a relational database, a NoSQL database, a NewSQL database, and/or any other suitable organized collection of data.

In at least one example, data store 140 may include (e.g., store, host, access, maintain, etc.) body data 142, audio data 146, and/or avatar data 148. As will be explained in greater detail below, in some examples, body data 142 may include any suitable information associated with one or more portions of a human body (e.g., body positions, body actions, muscle groups, muscle group interactions that may produce one or more body positions and/or body actions, etc.). Additionally, in some examples, body data 142 may include face data 144 that may include any suitable data associated with one or more faces including, without limitation, information associated with one or more visemes, information associated with one or more facial muscles and/or facial muscle groups, information associated with one or more one AUs that may be associated with one or more facial muscles and/or facial muscle groups, one or more AU parameters associated with an AU and a viseme, one or more onset curves associated with an AU and a viseme, one or more falloff curves associated with an AU and a viseme, and so forth.

Additionally, audio data 146 may include any information associated with one or more sounds that may be produced by a user. For example, audio data 146 may include, without limitation, information associated with one or more phonemes that may be produced by a user, data associated with one or more audio clips associated with one or more phonemes, data representative of one or more waveforms associated with one or more phonemes, data associated with recognition of one or more phonemes, and so forth.

Furthermore, avatar data 148 may include any information associated with one or more computer-generated avatars that may represent one or more users. In some examples, avatar data 148 may include, without limitation, information associated with one or more two-dimensional models, information associated with one or more three-dimensional models, animation and/or movement data associated with a computer-generated avatar, data associated with relationships between and/or among computer-generated avatars, and so forth. In some examples, avatar data 148 may additionally or alternatively include one or more articulations, points, meshes, parameters, controls, and so forth that may be included in a computer-generated avatar and that may be adjusted and/or manipulated (e.g., by one or more of modules 102) to model and/or simulate actions of one or more muscles or muscle groups. In further examples, avatar data 148 may additionally or alternatively include one or more facial articulations, points, meshes, parameters, controls, and so forth that may be included in a computer-generated avatar and that may be adjusted and/or manipulated (e.g., by one or more of modules 102) to model and/or simulate actions of one or more AUs associated with one or more facial muscles and/or facial muscle groups.

Figure 2:
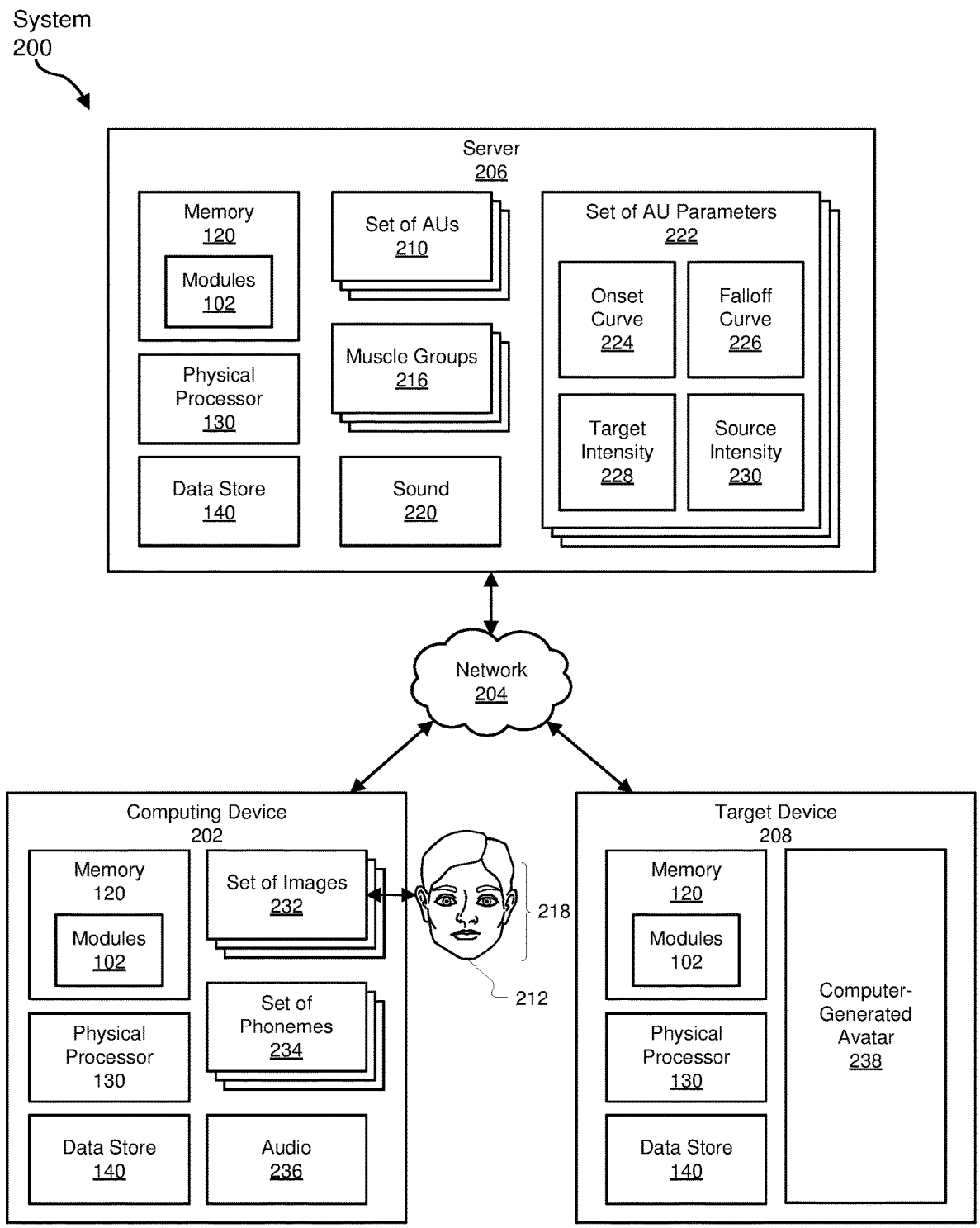
FIG. 2 is a block diagram of an example implementation of a system for incorporating human physical characteristics into facial avatar animations.

Example system 100 in FIG. 1 may be implemented in a variety of ways. For example, all or a portion of may represent portions of an example system 200 in FIG. 2. As shown in FIG. 2, example system 200 ("system 200") may include user device 202 in communication with server 206 and target device 208 via network 204. In at least one example, user device 202 may be programmed with one or more of modules 102. Additionally or alternatively, server 206 and/or target device 208 may be programmed with one or more of modules 102.

In at least one embodiment, one or more modules 102 from FIG. 1 may, when executed by user device 202, server 206, and/or target device 208, enable user device 202, server 206, and/or target device 208 to perform one or more operations to incorporate human physical characteristics into avatar animations. For example, as will be described in greater detail below, identifying module 104 may cause user device 202, server 206, and/or target device 208 to identify a set of AUs (e.g., set of AUs 210) associated with a face of a user (e.g., face 212), each AU associated with at least one muscle group (e.g., at least one muscle group included in muscle groups 216) engaged by the user to produce a viseme (e.g., viseme 218) associated with a sound produced by the user (e.g., sound 220).

Furthermore, determining module 106 may cause user device 202, server 206, and/or target device 208 to, for each AU in the set of AUs, determine a set of AU parameters (e.g., set of AU parameters 222) associated with the AU and the viseme. In some examples, the set of AU parameters may include (1) an onset curve (e.g., onset curve 224) associated with the viseme, and (2) a falloff curve (e.g., falloff curve 226) associated with the viseme. In some examples, the set of AU parameters may further include a target intensity level (e.g., target intensity 228) associated with the viseme and/or a source intensity level (e.g., source intensity 230) associated with a previous viseme.

In at least one embodiment, identifying module 104 may identify the set of AUs associated with the face of the user (e.g., set of AUs 210) by (1) capturing a set of images of the face of the user (e.g., set of images 232) while the user speaks a set of phonemes (set of phonemes 234), and (2) recording audio of the user (e.g., audio 236) as the user speaks the set of phonemes.

In at least one embodiment, identifying module 104 may further identify the set of AUs associated with the face of the user (e.g., set of AUs 210) by (1) identifying the viseme (e.g., viseme 218) based on the set of images and the recorded audio, and (2) associating a feature of the face of the user with a set of AUs based on the identification of the viseme, the set of images, and the recorded audio. In at least one embodiment, determining module 106 may determine the set of AU parameters (e.g., set of AU parameters 222) associated with the AU and the viseme by determining a set of AU parameters associated with the AU, the viseme, and the feature of the face of the user based on the set of images and the recorded audio.

Additionally, detecting module 108 may cause user device 202, server 206, and/or target device 208 to detect that the user has produced the sound (e.g., sound 220). Moreover, directing module 110 may cause user device 202, server 206, and/or target device 208 to direct a computer-generated avatar (e.g., computer-generated avatar 238) that represents the user to produce the viseme in accordance with the set of AU parameters associated with each AU in response to detecting that the user has produced the sound.

User device 202 generally represents any type or form of computing device capable of reading and/or executing computer-executable instructions. In at least one embodiment, user device 202 may accept one or more directions from server 206 and/or target device 208. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

In some examples, although not shown in FIG. 2, user device 202 may include one or more sensors that may gather data associated with an environment that includes user device 202. For example, user device 202 may include an imaging device configured to capture one or more portions of an electromagnetic spectrum (e.g., a visible-light camera, an infrared camera, an ultraviolet camera, etc.), an inertial measurement unit (IMU), an accelerometer, a global positioning system device, a thermometer, a barometer, an altimeter, a microphone or other audio sensor, and so forth.

Network 204 generally represents any medium or architecture capable of facilitating communication and/or data transfer between user device 202, server 206, and/or target device 208. Examples of network 204 may include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In one embodiment, network 204 may facilitate communication between user device 202, server 206, and/or target device 208.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

Like user device 202, target device 208 generally represents any type or form of computing device capable of reading and/or executing computer-executable instructions. In at least one embodiment, target device 208 may accept one or more directions from user device 202 and/or server 206. Examples of target device 208 include, without limitation, servers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

In at least one example, user device 202, server 206, and/or target device 208 may be computing devices programmed with one or more of modules 102. All or a portion of the functionality of modules 102 may be performed by user device 202, server 206, target device 208, and/or any other suitable computing system. As will be described in greater detail below, one or more of modules 102 from FIG. 1 may, when executed by at least one processor of user device 202, server 206, and/or target device 208, may enable user device 202, server 206, and/or target device 208 to incorporate human physical characteristics into facial avatar animations.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example system 100 and/or example system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
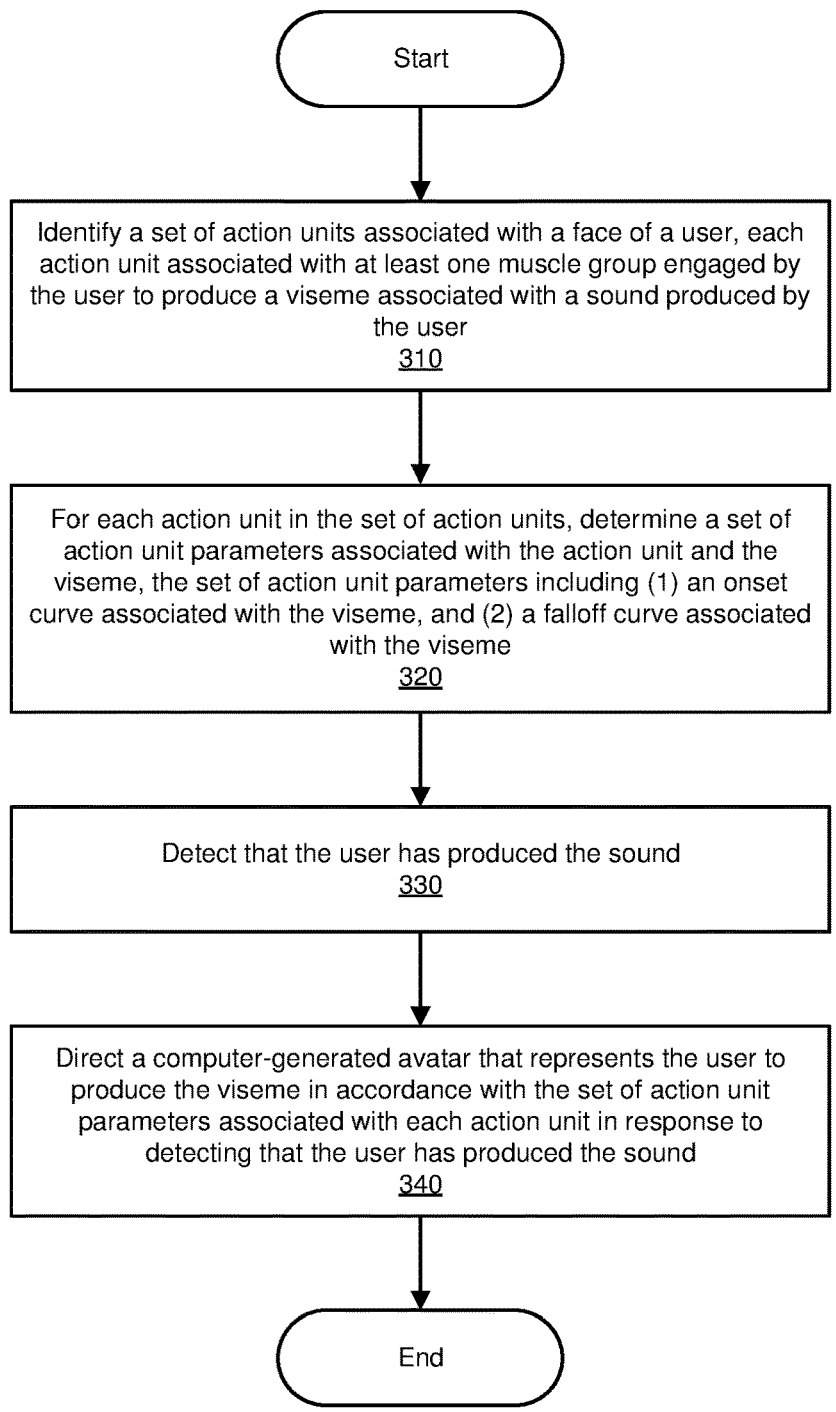
FIG. 3 is a flow diagram of an example method for incorporating human physical characteristics into facial avatar animations.

FIG. 3 is a flow diagram of an example computer-implemented method 300 for incorporating human physical characteristics into facial avatar animations. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may identify a set of AUs associated with a face of a user, each AU associated with at least one muscle group engaged by the user to produce a viseme associated with a sound produced by the user. For example, identifying module 104 may, as part of user device 202, server 206, and/or target device 208, identify set of AUs 210 associated with face 212. Each AU in set of AUs 210 may be associated with at least one muscle and/or muscle group included in muscle groups 216 that may be engaged by the user to produce viseme 218 associated with sound 220 produced by the user.

In some examples, a "phoneme" may include any perceptually distinct unit of sound in a specified language and that may distinguish one word from another, such as /p/, /b/, /d/, and /t/ in the English words pad, pat, bad, and bat. In some examples, a "viseme" may include a visual representation of a configuration (e.g., a shape) of a face of a person as the person produces an associated set of phonemes. In at least some contexts, a viseme may be conceptually viewed as a visual analog to a phoneme. Each viseme may be associated with a mouth shape for a specific set of phonemes. Visemes may be interpolated (e.g., chained, sequenced, sequentially presented, etc.) over time to produce and/or simulate natural facial motion.

Figure 4:
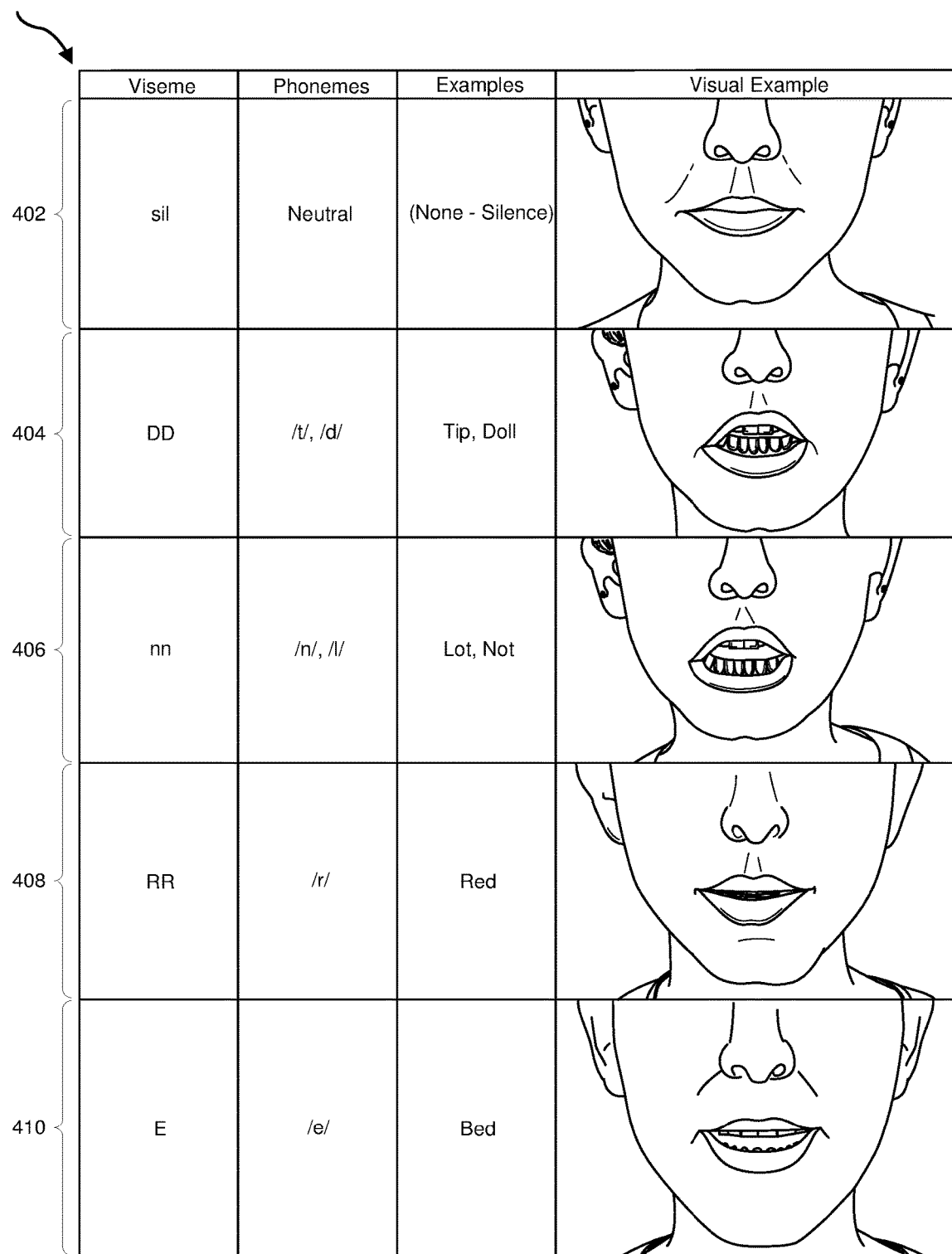
FIG. 4 shows various examples of viseme names, example phonemes associated with visemes, example words with pronunciations that may include phonemes, and visual depictions of a human face producing example visemes.
Figure 4:
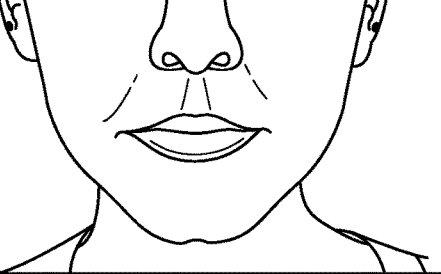
Figure 4:
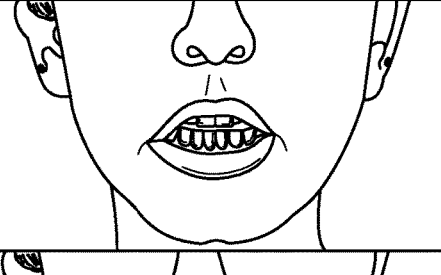
Figure 4:
Figure 4:

By way of illustration, FIG. 4 includes a table 400 that shows various examples of visemes, associated phonemes, examples of words that, when pronounced by a human, may cause the human's face to produce the visemes, and visual depictions of a human face producing associated visemes. For example, row 402 of table 400 shows an example of a viseme named "sil" that may correspond to a neutral facial position, expression, and/or configuration. Row 402 may also include a visual depiction of a human face producing a "sil" viseme. Additionally, row 404 of table 400 shows an example of a viseme named "DD" that a human face may produce when the human articulates /t/ or /d/ phonemes, such as in "tip" or "doll". Row 404 may also include a visual depiction of a human face producing a "DD" viseme. Also, row 406 of table 400 shows an example of a viseme named "nn" that a human face may produce when the human articulates /n/ or /l/ phonemes, such as in "lot" or "not". Row 406 may also include a visual depiction of a human face producing a "nn" viseme. Furthermore, row 408 of table 400 shows an example of a viseme named "RR" that a human face may produce when the human articulates /r/ phonemes, such as in "red". Row 408 may also include a visual depiction of a human face producing a "RR" viseme. Moreover, row 410 of table 400 shows an example of a viseme named "EE" that a human face may produce when the human articulates /e/ phonemes, such as in "bed". Row 410 may also include a visual depiction of a human face producing a "EE" viseme.

The examples included in table 400 are not exhaustive and/or exclusive and may only represent a selection of a few visemes that may be associated with one or more phonemes. The chart included below, which is also not exhaustive and/or exclusive, may include various visemes that may be associated with various phonemes.

| Viseme Name | Phonemes | Examples |
| --- | --- | --- |
| sil | neutral | (none - silence) |
| PP | /p/, /b/, /m/ | put, bat, mat |
| FF | /f/, /v/ | fat, vat |
| TH | /θ/, /d/ | think, that |
| DD | /t/, /d/ | tip, doll |
| kk | /k/, /g/ | call, gas |
| CH | /tʃ/, /dʒ/ | chair, join, she |
| SS | /s/, /z/ | sir, zeal |
| nn | /n/, /l/ | lot, not |
| RR | /r/ | red |
| aa | /ɒ/ | car |
| E | /e/ | bed |
| I | /I/ | tip |
| O | /oʊ/ | toe |
| U | /ʊ/ | book |

In some examples, an "action unit" may include any information that describes actions of individual muscles and/or groups of muscles. In some examples, an AU may be associated with one or more facial muscles that may be engaged by a user to produce a viseme. For example, an AU may be associated with a zygomaticus major facial muscle which, when contracted, may draw an angle of a human mouth in a superior direction (e.g., toward the top of the head), which may cause the human mouth to smile. Hence, in this example, an AU may be defined that describes an action of the zygomaticus major muscle.

In some examples, an AU may be part of, associated with, included in, and/or defined by a predefined taxonomic system, such as the Facial Action Coding System (FACS). The FACS may encode movements of individual facial muscles from slight differences and/or changes in facial appearance. As an example, FACS may define an AU with a number of 12 and a name of "lip corner puller" that may be associated with an action of the zygomaticus major muscle. In addition, the FACS may define a number of "action descriptors" (AD) that may describe unitary movements that may involve actions of several muscle groups, such as a forward-thrusting movement of the jaw. In some examples, the term "action unit" as used herein may include and/or encompass one or more ADs defined by and/or included in the FACS.

In some examples, an "intensity" of an AU may describe a degree of transition from a neutral position of an AU to a maximum position of the AU. Continuing with the previous example, an intensity of AU 12 associated with the zygomaticus major facial muscle may describe a degree of transition of the zygomaticus major from a neutral position (i.e., relaxed and/or not contracted) to a maximum position (i.e., contracted and/or fully contracted). An intensity of an AU may be noted in any suitable way. For example, as shown in the table below, the FACS may define a system of annotation for describing intensities of AUs by appending letters A-E (e.g., for minimal-maximal intensity) to an AU number. For example, "AU 1A" may indicate a weak trace of AU 1 and AU 1E may indicate a maximum intensity possible for AU 1.

| Letter | Intensity |
| --- | --- |
| A | Trace |
| B | Slight |
| C | Marked or pronounced |
| D | Severe or extreme |
| E | Maximum |

In further examples, an intensity of an AU may be noted and/or described, without limitation, in terms of a portion of a whole, a rate, an absolute value, a relative value, and so forth. For example, an intensity of an AU may be noted and/or described as a percentage, where a higher percentage may indicate a higher intensity of the AU, with 0% representing an unobservable and/or neutral intensity of the AU and 100% representing a maximum intensity of the AU. In additional examples, an intensity of an AU may be noted and/or described as a portion of a whole, with 0 representing an unobservable and/or neutral intensity of the AU and 1 representing a maximum intensity of the AU. For example, an intensity of 0.500 may represent a medium intensity of the AU, and/or may be similar in intensity to a marked or pronounced intensity of the AU.

Figure 5:
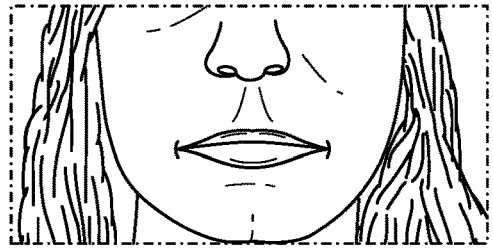
FIG. 5 shows various examples of action units, action unit names, and visual depictions of a human face when various action units may be at a maximum intensity.
Figure 5:
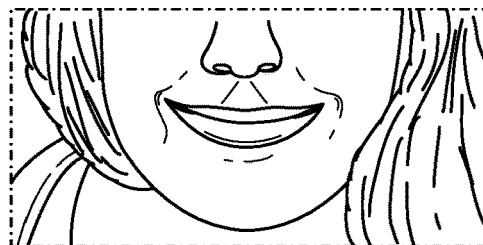
Figure 5:
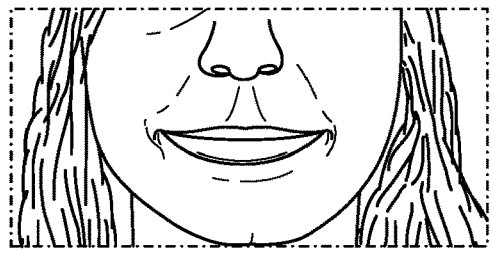
Figure 5:
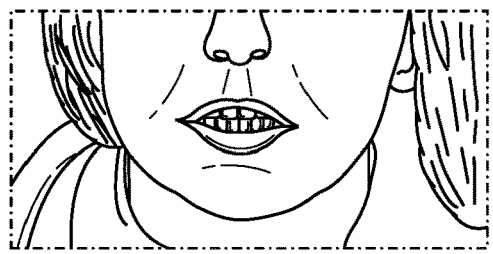
Figure 5:

By way of illustration, FIG. 5 includes a table 500 that shows various examples of AUs, AU names, and visual depictions of a human face when the AU is at a maximum intensity. Row 502 illustrates a base or neutral intensity (e.g., a neutral facial position, expression, and/or configuration). Row 504 shows an example of a maximum intensity of an AU 12 named "Lip Corner Puller" that may be associated with a zygomaticus major muscle and/or muscle group. Row 506 shows an example of a maximum intensity of an AU 14 named "Dimpler" that may be associated with a buccinator muscle and/or muscle group. Row 508 shows an example of a maximum intensity of an AU 14 named "Lower Lip Depressor" that may be associated with a depressor labii inferioris muscle and/or muscle group. Row 510 shows an example of a maximum intensity of an AU 22 named "Lip Funneler" that may be associated with an orbicularis oris muscle and/or muscle group.

The examples included in table 500 are not exclusive or exhaustive and may only represent a selection of possible AUs that may describe actions of a selection of individual muscles and/or groups of muscles. The chart included below may include a non-exhaustive and/or non-exclusive listing of various AUs included in the FACS and that may describe actions of individual muscles and/or muscle groups.

| AU number | FACS name | Muscular basis |
| --- | --- | --- |
| 0 | Neutral face | |
| 1 | Inner brow raiser | frontalis (pars medialis) |
| 2 | Outer brow raiser | frontalis (pars lateralis) |
| 4 | Brow lowerer | depressor glabellae, depressor supercilii, corrugator supercilii |
| 5 | Upper lid raiser | levator palpebrae superioris, superior tarsal muscle |
| 6 | Cheek raiser | orbicularis oculi (pars orbitalis) |
| 7 | Lid tightener | orbicularis oculi (pars palpebralis) |
| 8 | Lips toward each other | orbicularis oris |
| 9 | Nose wrinkler | levator labii superioris alaeque nasi |
| 10 | Upper lip raiser | levator labii superioris, caput infraorbitalis |
| 11 | Nasolabial deepener | zygomaticus minor |
| 12 | Lip corner puller | zygomaticus major |
| 13 | Sharp lip puller | levator anguli oris (also known as caninus) |
| 14 | Dimpler | buccinator |
| 15 | Lip corner depressor | depressor anguli oris (also known as triangularis) |
| 16 | Lower lip depressor | depressor labii inferioris |
| 17 | Chin raiser | mentalis |
| 18 | Lip pucker | incisivii labii superioris and incisivii labii inferioris |
| 19 | Tongue show | |
| 20 | Lip stretcher | risorius w/platysma |
| 21 | Neck tightener | platysma |
| 22 | Lip funneler | orbicularis oris |
| 23 | Lip tightener | orbicularis oris |
| 24 | Lip pressor | orbicularis oris |
| 25 | Lips part | depressor labii inferioris, or relaxation of mentalis or orbicularis oris |
| 26 | Jaw drop | masseter; relaxed temporalis and internal pterygoid |
| 27 | Mouth stretch | pterygoids, digastric |
| 28 | Lip suck | orbicularis oris |

In some examples, to enable a rich set of behaviors to accompany articulation of audio for virtual avatars, one or more of modules 102 (e.g., identifying module 104, determining module 106, etc.) may break down composite viseme shapes into one or more codified sets of AUs at variable levels of intensity. By way of illustration, FIG. 6 includes a table 600 that illustrates an identified set of AUs and/or AU parameters associated with a face that is producing a viseme named "nn" that may correspond to phonemes /n/ and/or /l/. As shown, one or more of modules 102 (e.g., identifying module 104, determining module 106, etc.) may determine that viseme nn may be produced by AU 14 ("Dimpler") at an intensity of 0.200, AU 16 ("Lower Lip Depressor") at an intensity of 0.600, and AU 22 ("Lip Funneler") at an intensity of 0.180.

Hence, in some examples, one or more of modules 102 (e.g., identifying module 104) may, when a user speaks an /l/ phoneme, determine that the /l/ phoneme may be associated with an nn viseme. One or more of modules 102 (e.g., identifying module 104) may further identify a set of AUs that includes AUs 14, 16, and 22 associated with respective muscles and/or muscle groups buccinator, depressor labii inferioris, and orbicularis oris. The user may engage the respective muscle groups when producing the nn viseme. As will be described in greater detail below, one or more of modules 102 (e.g., determining module 106) may, for each AU in the set of AUs, determine a set of AU parameters associated with the AU and the viseme, such as a target intensity level for the AU of 0.200, 0.600, and 0.180, respectively.

Identifying module 104 may identify set of AUs 210 associated with face 212 in a variety of contexts. For example, as mentioned above, data store 140 may include face data 144 that may include information associated with a set of AUs that may be associated with and/or may correspond to one or more muscle groups included in most human faces. Identifying module 104 may therefore access face data 144 and may identify set of AUs 210 included in face data 144.

In additional embodiments, one or more of the systems described herein (e.g., identifying module 104, determining module 106, etc.) may collect and/or use a personalized set of metadata that describes AU parameters based on muscles and/or muscle movements of the given user. While human faces may share AUs, a person's size, age, culture, language, and other factors may result in, for example, differences in ratios of muscle sizes, distances of contraction/expansion of muscles, speeds at which muscles ease into and/or out of different shapes, and so forth. Such differences may be unique and recognizable, particularly for people with distinctive features, facial behaviors, facial behavioral asymmetry, and so forth.

Hence, in some embodiments, identifying module 104 may identify set of AUs 210 associated with face 212 by (1) capturing set of images 232 as the user speaks set of phonemes 234, (2) recording audio 236 of the user as the user speaks set of phonemes 234, (3) identifying viseme 218 based on set of images 232, and (4) associating a feature of face 212 with set of AUs 210 based on set of images 232 and audio 236.

In some examples, set of phonemes 234 may include a predetermined set of phrases that may include phonemes that may be useful in analyzing human speech patterns and/or human visemes. For example, set of phonemes 234 may include one or more sentences included in and/or based on the Harvard sentences. Additionally or alternatively, set of phonemes 234 may further include any suitable directions and/or prompts that, when executed by the user, may cause the user to produce one or more visemes. For example, set of phonemes 234 may include prompts that, when presented to a user, prompt the user to laugh, smile, and/or otherwise engage the user's facial muscles in specific ways.

In some examples, identifying module 104 may present set of phonemes 234 to the user (e.g., via a display device included in user device 202), and may prompt the user to produce set of phonemes 234 (e.g., speak a set of words that, when spoken by the user, may result in the user producing one or more phonemes), and may capture set of images 232 of face 212 as the user speaks set of phonemes 234 and/or otherwise responds to one or more prompts included in set of phonemes 234. Identifying module 104 may also record audio of the user speaking and/or responding to set of phonemes 234.

Identifying module 104 may capture set of images 232 and/or may record audio 236 in any suitable way. For example, as described above, although not shown in FIG. 2, user device 202 may include one or more sensors that may gather data associated with an environment that includes user device 202. The sensor may include a suitable imaging device and/or an audio recording device that may be capable of capturing set of images 232 (e.g., a series of images, a video file, a set of frames of a video file, etc.) and/or recording audio 236 (e.g., a recording of the user producing phonemes 234 and/or responding to prompts included in phonemes 234). Hence, in at least one example, identifying module 104 may cause an imaging device and an audio recording device included in user device 202 to capture set of images 232 and/or record audio of the user as the user speaks set of phonemes 234.

Based on set of phonemes 234 (e.g., a source transcript presented to the user that the user is prompted to speak) and recorded audio 236, identifying module 104 may identify viseme 218. For example, identifying module 104 may identify, using any suitable speech recognition technique, a portion of audio 236 where the user is producing a particular phoneme, such as an /r/ phoneme, an /n/ phoneme, a /t/ phoneme, and so forth. Identifying module 104 may then correlate a portion of set of images 232 with the portion of audio 236 where the user is producing the particular phoneme and may identify viseme 218 from the portion of set of images 232 via any suitable image recognition technique.

Identifying module 104 may employ any suitable face tracking and/or identification system to identify set of AUs 210 associated with face 212. For example, identifying module 104 may utilize and/or incorporate a suitable FACS face tracking technology to identify and/or retrieve the FACS AUs from set of images 232. Furthermore, identifying module 104 may associate a feature of the face of the user (e.g., a portion of the user's face that may generally correspond to a set of muscle groups associated with the set of AUs) with the set of AUs based on the identification of the viseme, the set of images, and the recorded audio.

Hence, embodiments of the systems and methods described herein may identify a set of AUs associated with a face of a user, which may enable the systems and methods described herein to determine and apply a set of AU parameters to corresponding AUs of a computer-generated avatar, thereby enabling the computer-generated avatar to exhibit and/or reproduce life-like motion in real-time.

Returning to FIG. 3, at step 320, one or more of the systems described herein may, for each AU in the set of AUs, determine a set of AU parameters associated with the AU and the viseme. The set of AU parameters that may include (1) an onset curve associated with the viseme, and (2) a falloff curve associated with the viseme. For example, determining module 106 may, as part of user device 202, server 206, and/or target device 208 in FIG. 2, for each AU in set of AUs 210, determine set of AU parameters 222 associated with the AU and viseme 218. Furthermore, as shown in FIG. 2, in some examples, set of AU parameters 222 may include onset curve 224 and falloff curve 226.

In order to more accurately reproduce movement of individual muscle groups, embodiments of the systems and methods described herein may determine, define, and/or codify a set of parameters that may describe how facial muscles (e.g., muscle groups 216) ease into and/or out of a viseme. For example, for each AU in set of AUs 210, determining module 106 may determine set of AU parameters 222 that may be associated with the AU and viseme 218.

The set of AU parameters may include (1) an onset curve (e.g., onset curve 224) associated with the viseme, and (2) a falloff curve (e.g., falloff curve 226) associated with the viseme. In some embodiments, an onset curve may describe a rate of change over time of an intensity level of an AU as the user produces the viseme. For example, onset curve 224 may be associated with a viseme nn and AU 16 ("Dimpler"). Onset curve 224 may include a curve that describes a rate of change over time of an intensity of AU 16 as the user produces viseme nn. Continuing with this example, falloff curve 226 may include a curve that describes a rate of change over time of the intensity level of AU 14 subsequent to the user producing viseme nn.

Onset and falloff curves may be conceptualized as a way to specify a maximum velocity and/or activation/deactivation velocity of a given muscle group. Thus, as a person strains his or her lips, such as with rapid queuing or chaining of mouth shapes (e.g., visemes), the person may distort a shape of his or her mouth in varying ways to make way for a next mouth shape. Such co-articulations (e.g., chained visemes) may be modeled (e.g., identified, determined, tracked, etc.) within a set of AU parameters associated with an AU and a viseme. For example, a limit of a possible speed at which a muscle may produce a viseme may be included in a set of AU parameters associated with the AU and the viseme. When a computer-generated avatar is directed to produce visemes in accordance with AUs and suitable AU parameters in sequence as described herein, the computer-generated avatar may produce the sequence of visemes in a realistic and/or lifelike manner.

Figure 7:
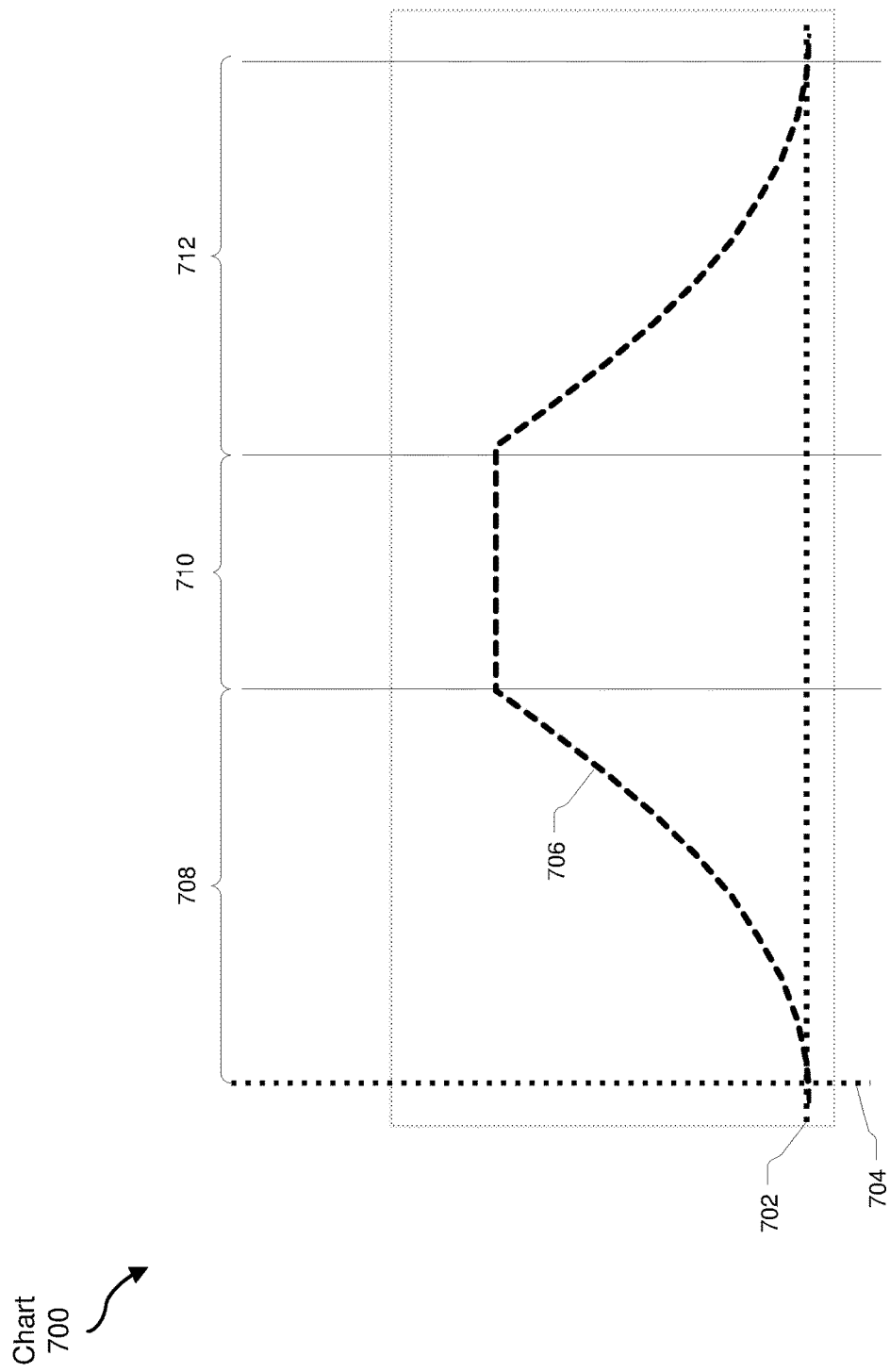
FIGS. 7-9 illustrate various onset curves and falloff curves that may describe rates of change of intensity levels of action units associated with various visemes and/or body actions.

By way of illustration, FIG. 7 includes a chart 700 that may show an onset and a falloff curve associated with an AU included in a set of AUs associated with a viseme, such as AU 16 (Lower Lip Depressor) associated with viseme nn. As shown, chart 700 includes a time axis 702 and an intensity axis 704. As further shown in FIG. 7, chart 700 further includes a curve 706. Curve 706 may indicate an intensity over time of an AU. Onset period 708 of curve 706 may include an onset curve associated with the AU as a user produces the viseme. Also, viseme presentation period 710 may indicate a time during which the AU is at a target intensity level associated with the viseme (e.g., an intensity level of the AU while the user is producing the viseme). Furthermore, falloff period 712 may include a falloff curve that may describe a rate of change over time of the intensity of the AU subsequent to the user producing the viseme (e.g., subsequent to the period of time indicated by viseme presentation period 710).

Although curve 706 may indicate an onset curve that describes a rate of change over time of the intensity level of an AU from a neutral intensity level, in additional examples, an onset curve may describe a rate of change over time of the intensity level of the AU from any suitable intensity level to the target intensity level. For example, a set of AU parameters may further include a source intensity level associated with a previous viseme. The onset curve may therefore describe a rate of change over time of the intensity level of the AU from the source intensity level to the target intensity level. Similarly, a falloff curve may describe a rate of change over time of the intensity level of the AU from the target intensity level to an additional intensity level, such as a neutral intensity level and/or an intensity level associated with a subsequent viseme.

In some examples, a set of AU parameters (e.g., set of AU parameters 222) may further include a peak transition velocity of a muscle group associated with the AU. For example, as may be apparent from FIG. 7, curve 706 may indicate a rate of change over time of an intensity level of the AU and/or an acceleration over time of the intensity level of the AU. For example, a slope of curve 706 at a particular point in time may indicate a transition velocity of the muscle group associated with the AU at the particular point in time. Furthermore, a slope of a curve representative of changes in the slope of curve 706 over time may further indicate a transitional acceleration of the muscle group associated with the AU.

In some examples, curve 706 may further indicate a peak transition velocity of a muscle group associated with the AU associated with curve 706. For example, a maximum slope of curve 706 may indicate a peak transition velocity of the muscle group associated with the AU associated with curve 706. As will be described in more detail below, in some examples, curve 706 may be defined such that the slope of curve 706 does not exceed a peak transition velocity of the muscle group, such as during an onset period (e.g., onset period 708), a viseme presentation period (e.g., viseme presentation period 710), a falloff period (e.g., falloff period 712), or a period of transition from one viseme to another.

Figure 8:
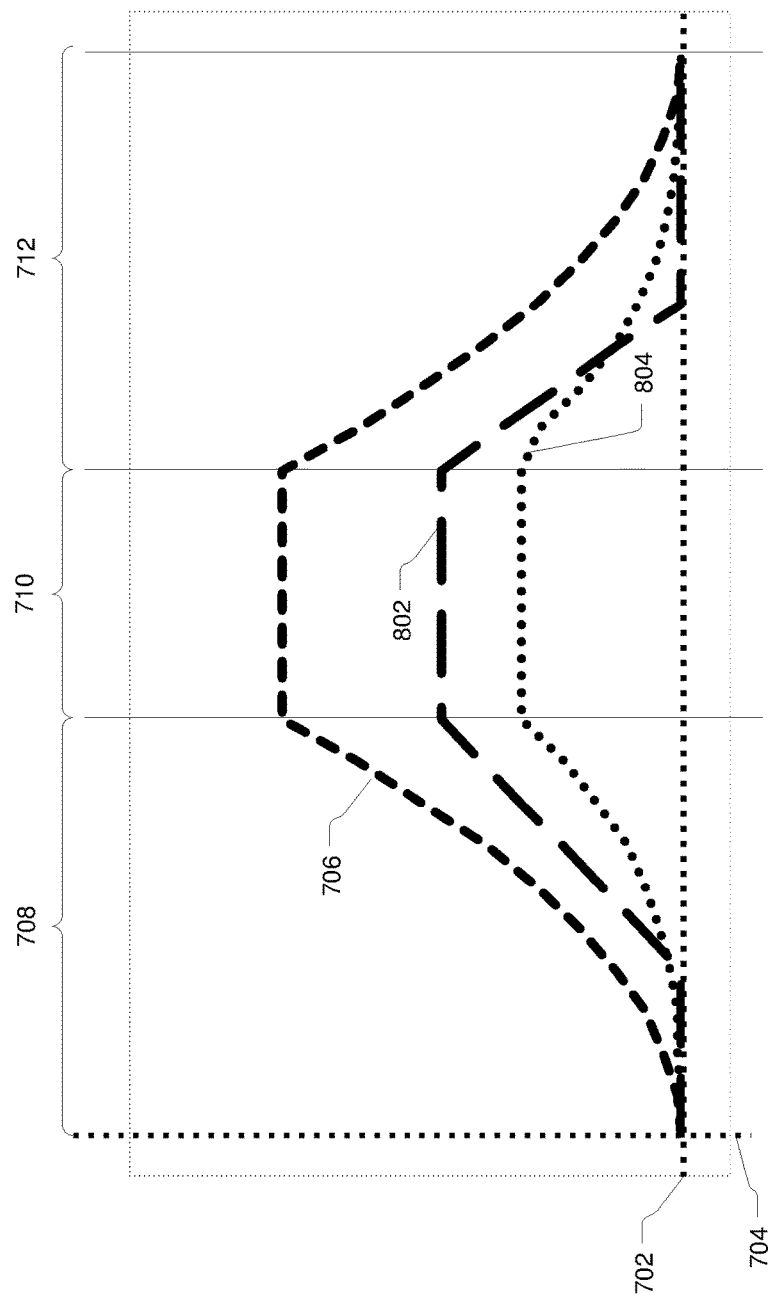

FIG. 8 includes a chart 800 that may show onset and falloff curves associated with a plurality of AUs that may be included in a set of AUs associated with a viseme, such as AU 14 ("Dimpler"), AU 16 ("Lower Lip Depressor"), and AU 22 ("Lip Funnier") associated with viseme nn. In addition to the elements included in chart 700, chart 800 further includes curve 802 and curve 804. Each of curve 706, curve 802, and curve 804 may indicate an intensity over time of a different AU included in a set of AUs. For example, chart 800 may represent onset curves, target intensity levels, and/or falloff curves associated with an nn viseme, with curve 706 corresponding to AU 16, curve 802 corresponding to AU 14, and curve 804 corresponding to AU 22. Each of curve 706, curve 802, and curve 804 may have different onset curves, target intensity levels, and/or falloff curves, which may indicate that each muscle group associated with each AU may produce viseme nn in accordance with different intensities over different periods of time.

Figure 6:
FIG. 6 illustrates an example of a set of action units associated with a face of a user, each action unit associated with at least one muscle group engaged by the user to produce a viseme.
Figure 6:
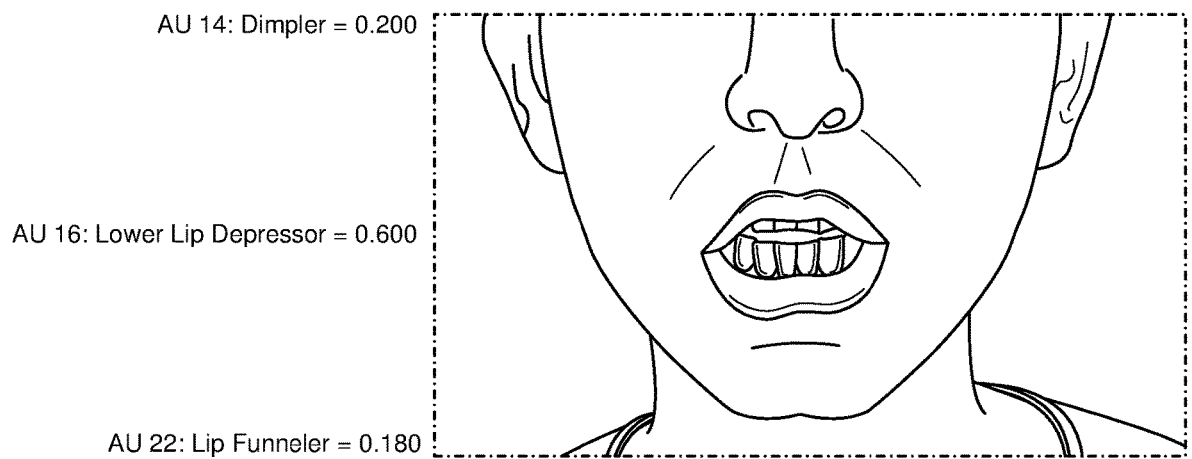

For example, as shown in FIG. 8, curve 706 has a relatively smooth parabolic shape during onset period 708, which may indicate that an intensity level associated with AU 16 may smoothly increase from a neutral or source intensity level to a target intensity level of 0.600 with an increasing velocity during onset period 708. Conversely, during the same period, curve 802 has a smooth linear onset curve, with an increase in intensity occurring after curve 706 has already started to increase. This may indicate that an intensity of AU 14 may increase linearly, with the increase in intensity beginning at a point in time after an intensity level of AU 16 has already started to increase. Curve 802 also indicates that AU 16 has a target intensity level less than the target intensity level of AU 16. This may indicate that a target intensity level of AU 14 may be relatively lower than a target intensity level of AU 14 (e.g., 0.200 instead of 0.600, as shown in FIG. 6). Furthermore, while curve 804 may indicate that AU 22 may have a similar shape during onset period 708 as curve 706, curve 804 has a lower target intensity level than either curve 706 and curve 804 (e.g., 0.180, as shown in FIG. 6).

In some examples, a falloff curve associated with an AU may have a different shape, rate, and/or intensity over time than an onset curve associated with the AU. By way of illustration, as further shown in FIG. 8, each of curve 706, curve 802, and curve 804 may have different shapes during falloff period 712 than during onset period 708. For example, curve 802 may, during falloff period 712, have a falloff curve that may have a slope that is substantially steeper than the slope of curve 802 during onset period 708. This may indicate that a muscle group associated with AU 16 may be capable of relaxing and/or transitioning to an additional viseme at a faster rate than it may contract and/or transition from a previous viseme. Hence, a falloff curve associated with an AU may describe different changes in intensity over time than an onset curve associated with the AU.

Determining module 106 may, for each AU in set of AUs 210, determine set of AU parameters 222 associated with the AU and viseme 218 in a variety of contexts. For example, as described above, data store 140 may include face data 144 that may include information associated with a set of AUs that may be associated with and/or may correspond to one or more muscle groups included in most human faces. Furthermore, face data 144 may include AU parameters, such as an onset curve (e.g., onset curve 224) and/or a falloff curve (e.g., falloff curve 226) associated with each AU that may be associated with a viseme and that may correspond to an average onset curve and/or average offset curve associated with the AU and the viseme (e.g., an onset curve and/or offset curve that may describe behavior of the muscle groups of most users when their facial muscles and/or muscle groups produce the viseme). Hence, determining module 106 may, for each AU included in set of AUs 210, determine set of AU parameters 222 associated with the AU and viseme 218 by accessing face data 144, identifying one or more AU parameters that may be associated with the AU and the viseme, and designating the identified one or more AU parameters as part of set of AU parameters 222.

As mentioned above, in one or more embodiments, one or more of modules 102 (e.g., identifying module 104, determining module 106, etc.) may personalize one or more AU parameters for a particular user. For example, as also described above, one or more of modules 102 (e.g., identifying module 104) may identify set of AUs 210 associated with face 212 by (1) capturing set of images 232 of face 212 of the user while the user speaks set of phonemes 234, (2) recording audio 236 of the user as the user speaks set of phonemes 234, (3) identifying viseme 218 based on set of images 232 and audio 236, and (4) associating a feature of the face of the user with set of AUs 210 based on the identification of viseme 218, set of images 232, and audio 236. Determining module 106 may determine set of AU parameters 222 associated with an AU included in set of AUs 210, viseme 218, and a feature of the face of the user based on set of images 232 and audio 236. This may effectively personalize set of AU parameters 222 for the user.

In some embodiments, one or more of modules 102 (e.g., identifying module 104, determining module 106, etc.) may process images and/or audio collected via one or more sensors (e.g., one or more sensors included in user device 202) in accordance with one or more machine learning techniques in order to identify the set of AUs associated with a face of a user and/or to determine a set of AU parameters associated with the AUs. For example, in some embodiments, one or more of modules 102 (e.g., identifying module 104, determining module 106, etc.) may use any suitable facial image data and/or audio data to train one or more convolutional neural networks (CNNs) to identify AUs associated with muscle groups engaged by user faces to produce visemes associated with sounds produced by users and/or to determine one or more AU parameters associated with visemes produced faces of users. This may effectively enable a computing system (e.g., user device 202, server 206, and/or target device 208) to identify a likely set of AUs and/or to determine a likely set of AU parameters associated with visemes produced by face 212 when later provided with set of images 232 and/or audio 236. Additionally or alternatively, a suitable CNN may be pre-trained and stored within a suitable data storage location (e.g., as part of face data 144 stored within data store 140). Thus, one or more of modules 102 (e.g., identifying module 104, determining module 106, etc.) may capture set of images 232 and/or audio 236 in any of the ways described herein, and may use the captured imagery and/or audio and the trained CNN to identify set of AUs 210 and/or to determine set of AU parameters 222 (e.g., to personalize set of AU parameters 222 for a particular or specific user).

In additional examples, determining module 106 may determine set of AU parameters 222 associated with an AU and viseme 218 by generating a digital signature of a face of a given user. In some examples, a "digital signature" may include any information associated with a face of a user including, but not limited to, one or more personalized AU parameters associated with the user. As will be described in greater detail below, such a digital signature may be applied to a computer-generated avatar to personalize actions, motions, and/or animations of the computer-generated avatar based on physical characteristics (e.g., AU parameters) associated with a specific user. This may cause the computer-generated avatar to present and/or approximate human physical characteristics associated with the specific user, such as unique activity of facial muscle groups that the specific user may engage in order to generate visemes while reproducing phonemes (e.g., speaking). This may give the computer-generated avatar a realistic and/or personalized appearance that may facilitate and/or improve communication with other users via the computer-generated avatar. In some examples, a digital signature may be portable and may be applied to any suitable computer-generated avatar.

Determining module 106 may generate a digital signature of the face of the user in a variety of contexts. For example, as described above, determining module 106 may personalize one or more AU parameters for a particular user. Thus, determining module 106 may generate a digital signature of the face of the user by including one or more of the personalized AU parameters (e.g., one or more of set of AU parameters 222 that have been personalized for the user) as part of the digital signature.

Returning to FIG. 3, at step 330, one or more of the systems described herein may detect that a user has produced a sound. For example, detecting module 108 may, as part of user device 202, server 206, and/or target device 208 in FIG. 2, detect that a user has produced sound 220.

Detecting module 108 may detect that the user has produced the sound in a variety of contexts. For example, in some embodiments, sound 220 may be stored within data store 140 as part of audio data 146 and may include one or more phonemes articulated by the user. Detecting module 108 may access and/or receive sound 220 from data store 140 and may identify the one or more phonemes included in sound 220 using any suitable speech recognition technique. Based on identifying the one or more phonemes included in sound 220, detecting module 108 may detect that the user has produced sound 220.

In additional examples, as described above, user device 202 may include a microphone or other audio sensor. Detecting module 108 may receive sound 220, which may include one or more phonemes articulated by the user, via the microphone or other audio sensor. Detecting module 108 may then identify the one or more phonemes included in sound 220 using any suitable speech recognition technique. Based on identifying the one or more phonemes, detecting module 108 may detect that the user has produced sound 220.

By way of illustration, user device 202 and target device 208 may be facilitating a video conference between a user of user device 202 (e.g., a "source user") and a user of target device 208 (e.g., a "target user"). The source user may wish to communicate with the target user via a computer-generated avatar rather than a video image. The source user may speak a series of phonemes into a microphone included in user device 202, which may be picked up as sound 220 by a microphone included in user device 202. Detecting module 108 may receive sound 220 via the microphone and may identify a phoneme included in the series of phonemes.

Based on identifying the phoneme, detecting module 108 may detect that the user has produced sound 220.

Returning to FIG. 3, at step 340, one or more of the systems described herein may direct a computer-generated avatar that represents the user to produce the viseme in accordance with the set of AU parameters associated with each AU in response to detecting that the user has produced the sound. For example, directing module 110 may, as part of user device 202, server 206, and/or target device 208 in FIG. 2, direct computer-generated avatar 238 that represents the user to produce viseme 218 in accordance with set of AU parameters 222 in response to detecting that the user has produced sound 220.

In some examples, a "computer-generated avatar" may include any graphical representation of a user. In some examples, a computer-generated avatar may include (1) an augmented reality avatar presented within an augmented reality environment, (2) a virtual reality avatar presented within a virtual reality environment, or (3) a video conferencing avatar presented within a video conferencing application.

In some examples, computer-generated avatar 238 may be configured to produce one or more visemes via one or more AUs. For example, computer-generated avatar 238 may include one or more facial articulations, points, meshes, parameters, and/or controls that may model and/or simulate actions of one or more AUs. Thus, directing module 110 may apply one or more AU parameters to a modeled AU included in computer-generated avatar 238. This may enable computer-generated avatar 238 to produce one or more visemes in accordance with one or more AUs and/or AU parameters associated with the one or more visemes.

To illustrate, detecting module 108 may detect that a user has produced an /l/ phoneme. One or more of modules 102 (e.g., identifying module 104, determining module 106, detecting module 108 and/or directing module 110) may determine that the /l/ phoneme is associated with an nn viseme, for which identifying module 104 has identified a set of AUs that include AU 14, AU 16, and AU 22. Determining module 108 has determined a set of AU parameters for each AU, which may include a target intensity level of 0.200 for AU 14, a target intensity level of 0.600 for AU 16, and a target intensity level of 0.180 for AU 22. Furthermore, the set of AU parameters for each AU may also include an onset curve associated with the nn viseme and a falloff curve associated with the nn viseme.

Directing module 110 may therefore, in at least one example, direct computer-generated avatar 238 to produce an nn viseme in accordance with the set of AU parameters associated with each AU. For example, directing module 110 may cause a modeled AU included in computer-generated avatar 238 that corresponds to AU 14 to express a target intensity level of 0.200 in accordance with an onset and offset curve associated with AU 14 and viseme nn. Directing module 110 may also direct a modeled AU included in computer-generated avatar 238 that corresponds to AU 16 to express a target intensity level of 0.600 in accordance with an onset curve and a falloff curve associated with AU 16 and viseme nn. Directing module 110 may further direct a modeled AU included in computer-generated avatar 238 that corresponds to AU 16 to express a target intensity level of 0.180 in accordance with an onset curve and falloff curve associated with AU 16 and viseme nn.

In some examples, by directing computer-generated avatar 238 to produce multiple visemes in sequence in accordance with associated AUs and/or AU parameters, directing module 110 may produce a series of changes to various muscle groups such that computer-generated avatar 238 may produce lifelike motion.

Hence, in some embodiments, identifying module 104 may further identify an additional set of AUs, each AU in the additional set of AUs associated with at least one muscle group engaged by the user to produce an additional viseme associated with an additional sound. Determining module 106 may also, for each AU in the additional set of AUs, further determine (1) an additional onset curve that describes a change of the AU over time to produce the additional viseme, (2) an additional falloff curve that describes a change of the AU over time subsequent to producing the additional viseme. Detecting module 108 may further detect the user producing the additional sound subsequent to the user producing the sound. Directing module 110 may further transition computer-generated avatar 238 from producing the viseme (e.g., viseme 218) to producing the additional viseme in accordance with the falloff curve (e.g., falloff curve 226) and the additional onset curve in response to detecting the user producing the additional sound subsequent to the user producing the sound (e.g., sound 220).

As an illustration, as described above in reference to FIG. 7, in some examples, a set of AU parameters may include a peak transition velocity of a muscle group associated with an AU. Directing module 110 may transition computer-generated avatar 238 from producing the viseme (e.g., viseme 218) to producing the additional viseme such that a transition velocity of the muscle group (e.g., a speed of transition) remains below the peak transition velocity of the muscle group during the transition. Such a peak transition velocity may represent a velocity or speed above which a transition from the viseme to the additional viseme may appear unnatural or jarring to a viewer.

Figure 9:
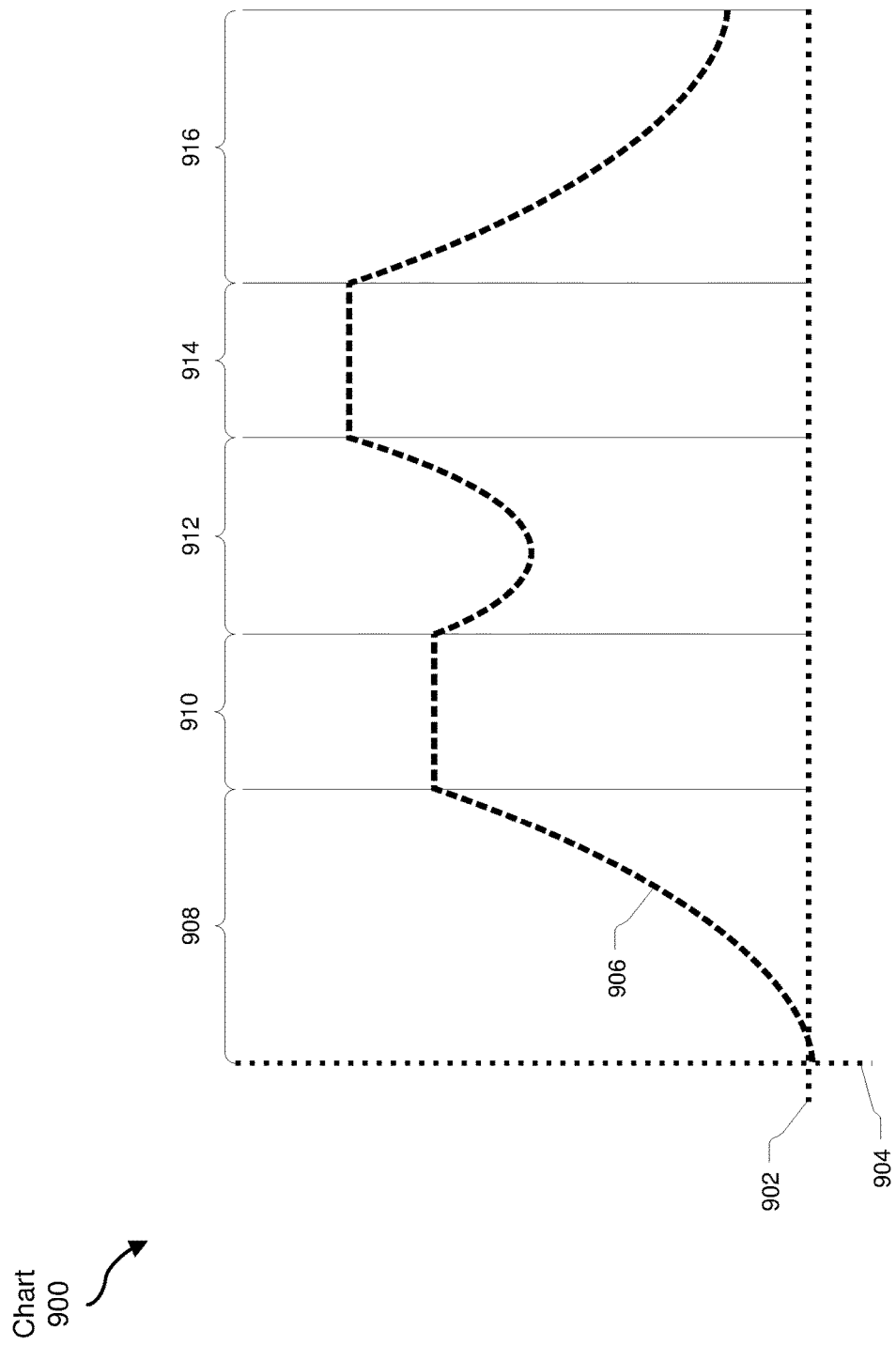

By way of illustration, FIG. 9 includes a chart 900 that may show onset and falloff curves associated with an AU associated with both an initial viseme and a subsequent viseme. As shown, chart 900 includes a time axis 902 and an intensity axis 904. As further shown in FIG. 9, chart 900 further includes a curve 906. Curve 906 may indicate an intensity over time of an AU. Onset period 908 may include an onset curve associated with the AU as directing module 110 directs computer-generated avatar 238 to produce the initial viseme. Initial viseme presentation period 910 may indicate a time during which directing module 110 is directing computer-generated avatar 238 to express an intensity of the AU at a target intensity level associated with the viseme.

Transition period 912 may indicate an intensity of the AU over time as directing module 110 directs computer-generated avatar 238 to transition from the initial viseme to the subsequent viseme. As shown by a portion of curve 906 in transition period 912, directing module 110 may cause computer-generated avatar 238 to smoothly transition from the target intensity level of the initial viseme to the target intensity level of the subsequent viseme.

In some examples, a set of AU parameters associated with the AU represented by curve 906 may include a peak transition velocity of the muscle group associated with the AU. Directing module 110 may smoothly transition computer-generated avatar 238 from producing the one viseme to producing an additional viseme by keeping a transition velocity of the muscle group below a peak transition velocity of the muscle group during the transition, thereby preventing directing module 110 from causing computer-generated avatar 238 to move in jarring, unrealistic, inconsistent, and/or artificial ways. As shown in FIG. 9, curve 906 is smooth, continuous, and continuously differentiable (i.e., does not include sharp angles) during transition period 912, which may indicate that directing module 110 transitions computer-generated avatar 238 from producing the initial viseme to producing the subsequent viseme without any jarring, sudden, or unnatural movements.

Additionally, in some examples, a portion of curve 906 within transition period 912 may be an additional onset curve that describes a change of the AU over time to produce the subsequent viseme. As described above, determining module 106 may determine the additional onset curve and may include the additional onset curve as part of determining set of AU parameters 222, and directing module 110 may direct computer-generated avatar 238 to produce the viseme in accordance with set of AU parameters 222 associated with each AU.

Moreover, additional viseme presentation period 914 may indicate a time during which directing module 110 is directing computer-generated avatar 238 to express a target intensity level of the AU associated with the subsequent viseme. Furthermore, falloff period 916 may indicate a falloff curve that may describe a rate of change over time of the intensity of the AU subsequent to directing computer-generated avatar 238 to produce the subsequent viseme (e.g., subsequent to the period of time indicated by additional viseme presentation period 914).

By directing computer-generated avatar 238 to transition from a viseme to an additional viseme (e.g., from an initial viseme to a subsequent viseme) in accordance with various AU parameters associated with the viseme and the additional viseme, transitions between visemes, and therefore continuous speech patterns produced by computer-generated avatar 238 in accordance with embodiments of the systems and methods described herein, may appear more natural and/or realistic than may be produced via traditional and/or conventional facial animation techniques.

Furthermore, in some examples, as described above, determining module 106 may generate a digital signature of a face of a user based on a determined set of AU parameters associated with each AU and the viseme (e.g., viseme 218). Hence, in at least one example, directing module 110 may direct computer-generated avatar 238 to produce a viseme (e.g., viseme 218) in accordance with the set of AU parameters by directing computer-generated avatar 238 to produce the viseme in accordance with the digital signature of the face of the user.

As a simplified illustration, as described above in reference to FIG. 7, a set of AU parameters for AU 14, AU 16, and AU 22 associated with an nn viseme may include target intensity levels of 0.200, 0.600, and 0.180, respectively. In contrast, a digital signature of a face of a user may include a personalized set of AU parameters that may more closely correspond to motions and/or expressions of the face of the user. For example, a digital signature may include target intensity levels for an nn viseme of 0.205, 0.620, and/or 0.190 for AU 14, AU 16, and/or AU 22, respectively. Continuing with this example, directing module 110 may then, when directing computer-generated avatar 238 to produce an nn viseme in accordance with personalized AU parameters included in the digital signature, cause modeled AUs included in computer-generated avatar 238 that correspond to AU 14, AU 16, and AU 22 to express target intensity levels of 0.205, 0.620, and 0.180, respectively.

By directing computer-generated avatar 238 to produce visemes in accordance with a digital signature of a face of a user, the systems and methods described herein may cause facial animations of computer-generated avatar 238 to resemble facial motions and/or activities of facial muscle groups of the user. This may improve realism and/or personalization of facial animations (e.g., speech animations) of computer-generated avatar 238 in comparison to traditional and/or conventional facial animation techniques.

As mentioned above, in one or more embodiments, one or more of modules 102 (e.g., identifying module 104, determining module 106, etc.) may personalize one or more parameters for a particular user. Although described by way of example above in reference to AU parameters used to produce visemes, such parameters may describe any relationship of a muscle group to a body action. Such parameters may be associated with any user, any suitable muscle group and any suitable predefined body action, such as a hand movement, a walking gait, a throwing motion, a head movement, and so forth.

Hence, in some embodiments, principles of this disclosure may be applied to improve animation of any suitable avatar that may represent any suitable portion of a body of a user. Therefore, the systems and methods described herein are therefore not limited to facial animation.

Figure 10:
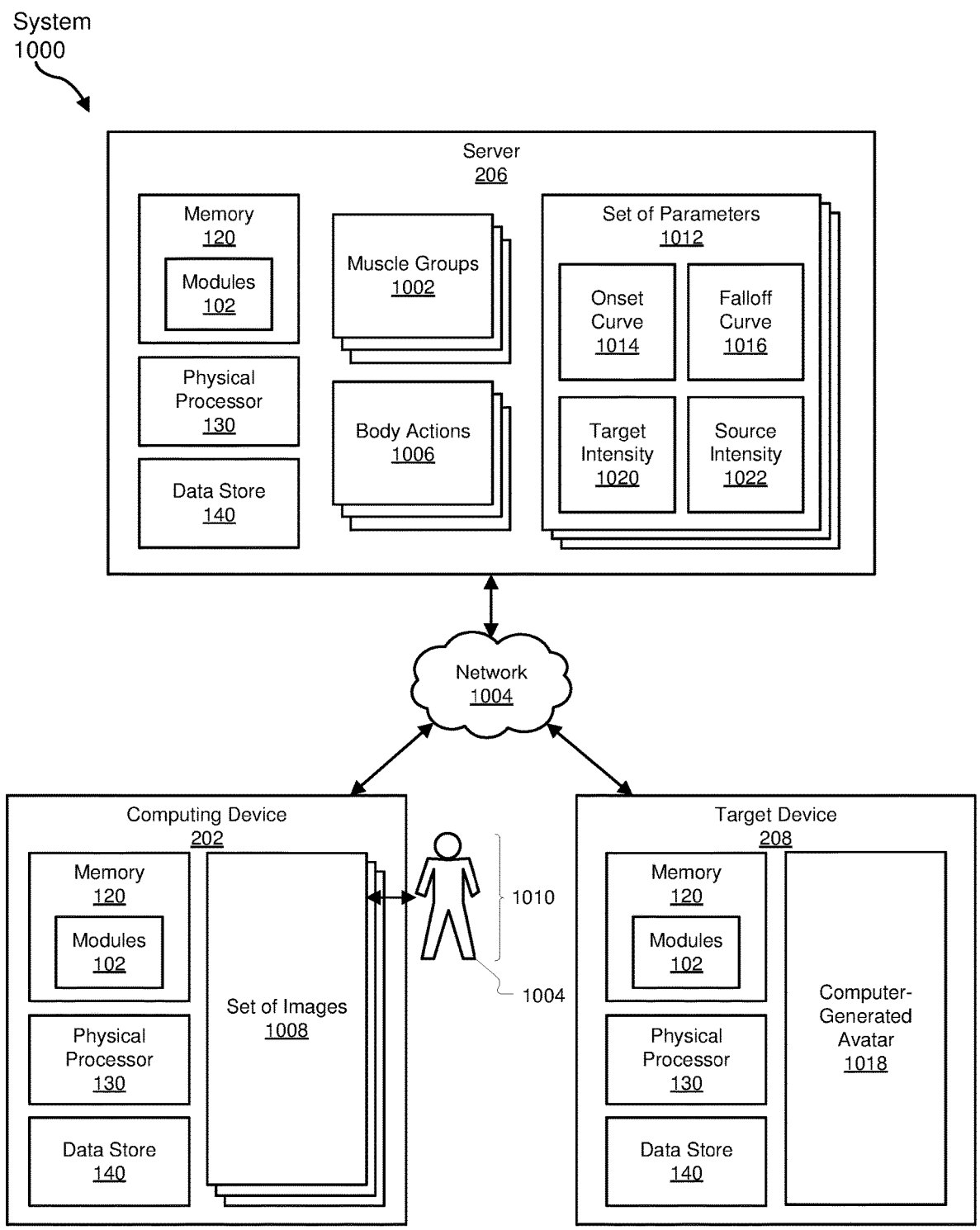
FIG. 10 is a block diagram of an additional example implementation of an additional system for incorporating human physical characteristics into avatar animations.

By way of illustration, FIG. 10 shows an alternative configuration of some elements included in FIG. 2. As shown in FIG. 10, example system 1000 ("system 1000") may include user device 202 in communication with server 206 and target device 208 via network 204. As in example system 200, user device 202 may be programmed with one or more of modules 102. Additionally or alternatively, server 206 and/or target device 208 may be programmed with one or more of modules 102.

In some embodiments, one or more modules 102 from FIG. 1 may, when executed by user device 202, server 206, and/or target device 208, enable user device 202, server 206, and/or target device 208 to perform one or more operations to incorporate human physical characteristics into avatar animations. For example, identifying module 104 may cause user device 202, server 206, and/or target device 208 to identify a muscle group (e.g., a muscle group included in muscle groups 1002) engaged by a user (e.g., user 1004) to execute a predefined body action (e.g., a predefined body action included in body actions 1006). In some examples, identifying module 104 may identify the muscle group by capturing a set of images of the user (e.g., set of images 1008) and associating a feature of a body of the user (e.g., body 1010) with the muscle group based on the predefined body action and the set of images. In at least one example, associating the feature of the body of the user with the muscle group based on the predefined body action and the set of images may include analyzing the set of images in accordance with a machine learning model trained to associate muscle groups with features of users' bodies based on images of users executing the predefined body action.

Furthermore, determining module 106 may cause user device 202, server 206, and/or target device 208 to determine, based on the set of images, a set of parameters (e.g., set of parameters 1012) associated with the user, the muscle group, and the predefined body action. In some examples, the set of parameters may include an onset curve (e.g., onset curve 1014) associated with the muscle group and execution of the predefined body action (e.g., by the user), and a falloff curve (e.g., falloff curve 1016) associated with the muscle group and execution of the predefined body action (e.g., by the user).

Moreover, directing module 110 may cause user device 202, server 206, and/or target device 208 to direct a computer generated avatar that represents the body of the user (e.g., computer-generated avatar 1018) to produce the predefined body action in accordance with the set of parameters. In some examples, one or more of modules 102 (e.g., detecting module 108) may detect that the user has executed the predefined body action, and directing the computer-generated avatar to execute the predefined body action in accordance with the set of parameters may include directing the computer-generated avatar to execute the predefined body action in response to detecting that the user has executed the predefined body action.

A body action may include any change in a position, orientation, configuration, direction, and so forth of any body part of a user. Such body actions may be described or encoded in any suitable way. For example, a Body Action and Posture (BAP) Coding System may, like the FACS described above, describe body posture units and/or body action units. A posture unit may represent a general alignment of one or a set of articulators (e.g., head, trunk, arms, etc.) to a particular resting configuration, which may show periodic changes known as posture shifts (e.g., a person leaning backward, arms crossed). An action unit may describe a local excursion of one or a set of articulators (e.g., the arms) outside a resting configuration with a very discrete onset (start point), a relatively short duration, and a distinct offset (end point) where the articulator returns to a resting configuration (e.g., head shake, pointing arm gesture, etc.).

Within the BAP coding system, codes describing postures and actions may be organized on two integrated levels. On a first level, BAP codes may describe anatomical articulation (i.e., which part of the body is actively moving) following kinesiological standards. The BAP coding system may allow the coding of articulation of the neck, head, trunk, upper and lower arms, and/or the lower limbs. By focusing on articulation, BAP codes may apply only to spatial movement caused by muscle contraction and not to passive displacement of any connected articulator. For example, spatial displacement of the head caused by trunk bending is passive and thus only an articulation of the trunk may be coded.

On a second level, BAP codes may refer to the form of the movement of the active body part (how the part of the body is moving). Movement may be described in terms of direction and orientation in three-dimensional space by adopting an anatomical and an external reference frame.

Actions may also be described on a functional level, parallel to the anatomical and form description level. Functional BAP codes may include behavioral classes such as emblems, illustrators, and manipulators. Emblems are conventionalized actions that have precise meanings. These symbolic actions may be culturally defined and may be used independently of speech. Manipulators may be actions in which one part of the body manipulates another body part or an object for some type of body contact, such as scratching, rubbing, etc. Illustrators may be conversational actions that support accompanying speech. They may illustrate a rhythm or content of a verbalized message. Contrary to emblems they may be tied to speech and may not have a fixed meaning. Two illustrator sub-types may include beats and deictics. Beats may be repetitive actions that accentuate points in time, illustrating structural or rhythmic aspects of co-occurring speech. A deictic may be a referential action indicating a real or abstract object, person, event or location in space (e.g., pointing).

A functional unit may be coded on a scale that may range from very subtle (e.g., 1) to very pronounced (e.g., 5). A functional unit may be coded as very subtle when it is executed with minor articulation (e.g., deictic pointing with a partly extended finger), for a very short period of time (e.g., few repetitions of a beat), or located in the peripheral movement space of the person (e.g., below the hips). On the other extreme, a functional unit may be coded as very pronounced (5) when it is supported by maximum articulation (e.g., deicitic pointing with fully extended finger and arm), stretched in time over several seconds (many repetitions of a beat), or located in the central movement space of the person (e.g., near the face).

By analogy to examples herein described in reference to FIGS. 2-9, in some embodiments, an onset curve may describe a rate of change over time of an intensity level of a muscle group as a user executes a predefined body action. Likewise, a falloff curve may describe a rate of change over time of the intensity level of the muscle group subsequent to the user executing the predefined body action.

Furthermore, the set of parameters may also include a target intensity level (e.g., target intensity 1020) associated with the predefined body action and a source intensity level (e.g., source intensity level 1022) associated with a previous predefined body action. The onset curve may therefore describe a rate of change over time of the intensity level of the muscle group from the source intensity level to the target intensity level, and the falloff curve may describe a rate of change over time of the intensity level of the muscle group from the target intensity level to an additional intensity level.

In some examples, one or more of modules 102 (e.g., identifying module 104) may identify an additional set of muscle groups, where each muscle group in the additional set of muscle groups may be engaged by the user to produce an additional predefined body action. One or more of modules 102 (e.g., determining module 106) may then, for each muscle group in the additional set of muscle groups, determine (1) an additional onset curve that describes a change of the muscle group over time to produce the additional predefined body action, and (2) an additional falloff curve that describes a change of the muscle group over time subsequent to producing the additional predefined body action. This may describe a transition from the predefined body action to the additional predefined body action.

In some embodiments, one or more of modules 102 (e.g., detecting module 108, directing module 110, etc.) may detect the user executing the additional predefined body action subsequent to the user executing the predefined body action. Hence, one or more of modules 102 (e.g., directing module 110) may transition the computer-generated avatar from executing the predefined body action to executing the additional predefined body action in accordance with the falloff curve and the additional onset curve in response to the system (e.g., detecting module 108) detecting the user executing the additional predefined body action subsequent to the user executing the predefined body action. This may result in movement or motion of the computer-generated avatar that may appear more natural and/or realistic than may be produced via traditional and/or conventional avatar animation techniques.

Furthermore, in some examples, similar to some examples described above, determining module 106 may generate a digital signature of at least a portion of the body of the user based on the set of parameters associated with the muscle group and the predefined body action. Hence, in at least one example, directing module 110 may direct computer-generated avatar 1018 to execute the predefined body action in accordance with the set of parameters associated with the muscle group by directing the computer-generated avatar that represents the user to execute the predefined body action in accordance with the digital signature of the portion of the body of the user. Hence, the systems and methods described herein may personalize animation of the computer-generated avatar such that individual and/or distinctive characteristics of the user's body actions may be incorporated into the animation of the computer-generated avatar. This may improve realism and/or personalization of animations (e.g., body action animations) of computer-generated avatar 1018 in comparison to traditional and/or conventional facial animation techniques.

Figure 11:
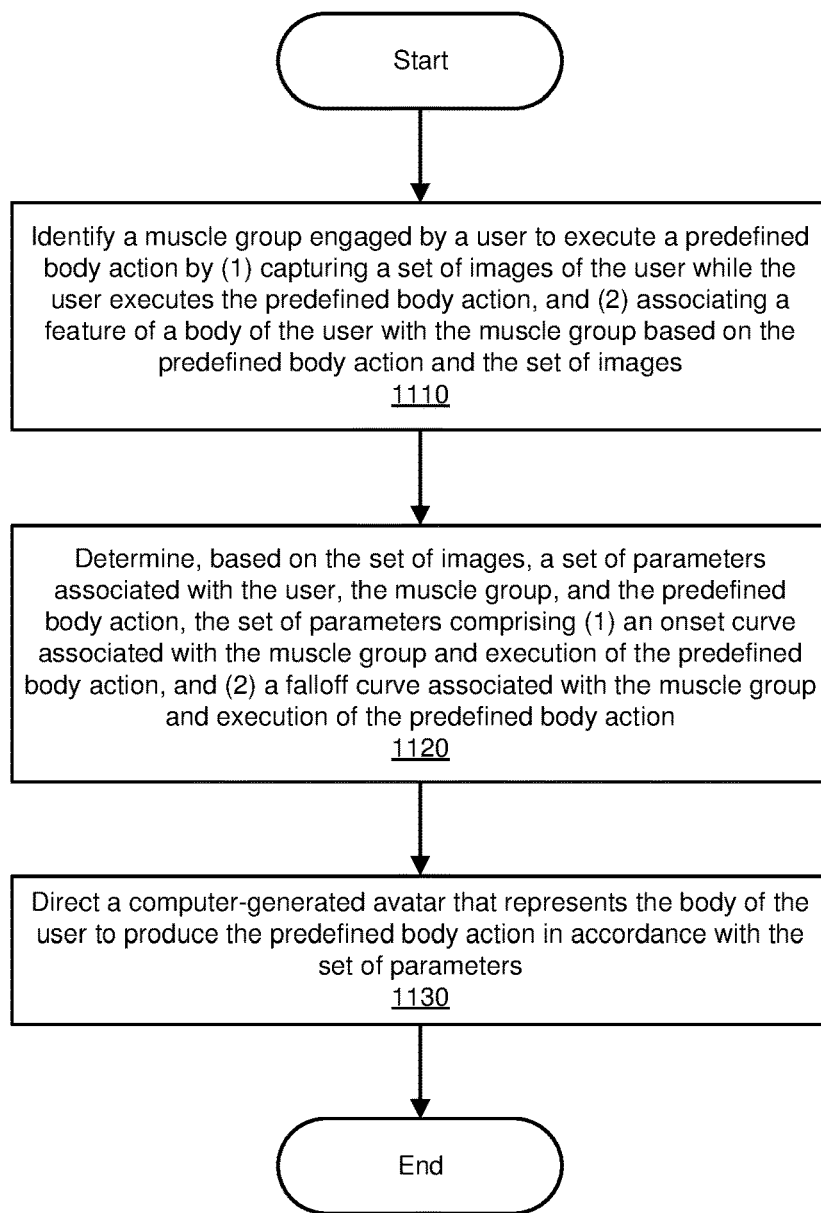
FIG. 11 is a flow diagram of an additional example method for incorporating human physical characteristics into avatar animations.

FIG. 11 is a flow diagram of an example computer-implemented method 1100 for incorporating human physical characteristics into avatar animations. The steps shown in FIG. 11 may be performed by any suitable computer-executable code and/or computing system, including example system 100 in FIG. 1, example system 200 in FIG. 2, and/or variations or combinations of one or more of the same. In one example, each of the steps shown in FIG. 10 may represent an algorithm whose structure includes and/or is represented by multiple sub-steps, examples of which will be provided in greater detail below.

As illustrated in FIG. 11, at step 1110, one or more of the systems described herein may identify a muscle group engaged by a user to execute a predefined body action by (1) capturing a set of images of the user while the user executes the predefined body action, and (2) associating a feature of a body of the user with the muscle group based on the predefined body action and the set of images. For example, identifying module 104 may identify a muscle group included in muscle groups 1002 engaged by user 1004 to execute a predefined body action included in body actions 1006. Identifying module 104 may identify the muscle group by capturing set of images 1008 while the user executes the predefined body action, and (2) associating a feature of body 1010 with the muscle group based on the predefined body action and set of images 1008.

At step 1120, one or more of the systems described herein may determine, based on the set of images, a set of parameters associated with the user, the muscle group, and the predefined body action, the set of parameters comprising (1) an onset curve associated with the muscle group and execution of the predefined body action, and (2) a falloff curve associated with the muscle group and execution of the predefined body action. For example, determining module 104 may determine, based on set of images 1008, set of parameters 1012 that may include an onset curve 1014 and an falloff curve 1016 associated with the muscle group included in muscle groups 1002 and the predefined body action included in body actions 1006.

At step 1130, one or more of the systems described herein may direct a computer-generated avatar that represents the body of the user to produce the predefined body action in accordance with the set of parameters. For example, directing module 110 may direct computer-generated avatar 1018 that represents the body 1010 of user 1004 to produce the predefined body action in accordance with the set of parameters.

As discussed throughout the instant disclosure, the disclosed systems and methods may provide one or more advantages over traditional animation systems. For example, the systems and methods described herein may take into account and/or model one or more characteristics of movement of individual muscle groups, such as differential motions of individual muscle groups as they ease into and/or out of particular positions (e.g., visemes). This may facilitate generalized reproduction of body behaviors (e.g., facial behaviors) by computer-generated avatars that may appear closer to natural behaviors. In some examples, benefits of the present disclosure may be realized with or without direct tracking, such as via a camera input that may track the face and/or body exactly as it moves.

Additionally, embodiments of the systems and methods described herein may determine, define, and/or codify a set of parameters that may describe how muscles (e.g., facial muscles, body muscles, etc.) and/or muscle groups (e.g., facial muscle groups, body muscle groups, etc.) may ease into and out of a viseme or other body action. For example, for each AU in a set of AUs identified as associated with a face of a user and/or a viseme, an example system may determine a set of AU parameters associated with the AU and the viseme. In some examples, the set of parameters may include (1) an onset curve associated with a body action or a viseme, and (2) an offset curve associated with the body action or the viseme. These onset and falloff curves may be conceptualized as a way to describe actions and/or interactions of muscle groups as they produce particular body actions and/or visemes.

Furthermore, as described above, embodiments of the instant disclosure may generate a digital signature of a face and/or body of a given user. Such a digital signature of a face and/or body of a user may include a personalized set of metadata that describes parameters (e.g., AU parameters, body action and/or posture parameters) based on muscles and/or muscle movements of the given user and may enable motions and/or expressions of a computer-generated avatar to more closely resemble individualized facial motions and/or body actions of the given user.

At least one embodiment may generate a digital signature of a face of a given user by capturing a set of images of the face of the user (e.g., via a camera, such as may be included in a mobile phone, computer, etc.) and/or recording audio of the user (e.g., via microphone, such as may be included in a mobile phone, computer, etc.) while the user speaks a predetermined set of phonemes. An embodiment may then encode into AU parameters various attributes of the face of the user, such as onset and/or falloff curves associated with one or more AUs associated with muscle groups engaged to produce one or more visemes. In some examples, machine learning models and/or techniques may be applied to determine various AU parameters such as behavioral curves and/or muscle activation intensities of a person and/or groups of persons. Thus, when replaying any performance (e.g., production of a phoneme and/or a sequence of phonemes) of a person, embodiments of this disclosure may infer and/or predict a highly personalized series of AU behaviors that may be unique to the person.

Additional or alternative embodiments may similarly encode other personalized body actions of the user. These unique qualities may be applied to any suitable computer-generated avatar (e.g., a two-dimensional avatar, a three-dimensional avatar, etc.) via a generated digital signature. Hence, a user may be able to take their recognizable likeness of motion with them even if they change their avatar form.

Moreover, in some embodiments, the above-described operations may be performed in real-time, which may facilitate improved real-time avatar-based and/or avatar-augmented communication such as via video conferencing applications, artificial reality (e.g., AR/VR) applications, and so forth.

EXAMPLE EMBODIMENTS

Example 1: A computer-implemented method comprising (1) identifying a muscle group engaged by a user to execute a predefined body action by (i) capturing a set of images of the user while the user executes the predefined body action, (ii) associating a feature of a body of the user with the muscle group based on the predefined body action and the set of images, (2) determining, based on the set of images, a set of parameters associated with the user, the muscle group, and the predefined body action, the set of parameters comprising (i) an onset curve associated with the muscle group and execution of the predefined body action, and (ii) a falloff curve associated with the muscle group and execution of the predefined body action, and (3) directing a computer-generated avatar that represents the body of the user to produce the predefined body action in accordance with the set of parameters.

Example 2: The computer-implemented method of claim 1, wherein (1) the onset curve describes a rate of change over time of an intensity level of the muscle group as the user executes the predefined body action, and (2) the falloff curve describes a rate of change over time of the intensity level of the muscle group subsequent to the user executing the predefined body action.

Example 3: The computer-implemented method of any of claims 1 and 2, wherein (1) the set of parameters further comprises (i) a target intensity level associated with the predefined body action, and (ii) a source intensity level associated with a previous predefined body action, (2) the onset curve describes a rate of change over time of the intensity level of the muscle group from the source intensity level to the target intensity level, and (3) the falloff curve describes a rate of change over time of the intensity level of the muscle group from the target intensity level to an additional intensity level.

Example 4: The computer-implemented method of any of claims 1-3, further comprising (1) identifying an additional set of muscle groups, each muscle group in the additional set of muscle groups engaged by the user to produce an additional predefined body action, (2) for each muscle group in the additional set of muscle groups, determining (i) an additional onset curve that describes a change of the muscle group over time to produce the additional predefined body action, and (ii) an additional falloff curve that describes a change of the muscle group over time subsequent to producing the additional predefined body action, (3) detecting the user executing the additional predefined body action subsequent to the user executing the predefined body action, and (4) transitioning the computer-generated avatar from executing the predefined body action to executing the additional predefined body action in accordance with the falloff curve and the additional onset curve in response to detecting the user executing the additional predefined body action subsequent to the user executing the predefined body action.

Example 5: The computer-implemented method of claim 4, wherein (1) the set of parameters further comprises a peak transition velocity of the muscle group, and (2) transitioning the computer-generated avatar from executing the predefined body action to producing the additional predefined body action comprises transitioning the computer-generated avatar from executing the predefined body action to producing the additional predefined body action such that a transition velocity of a portion of the computer-generated avatar that corresponds to the muscle group remains below the peak transition velocity of the muscle group during the transition.

Example 6: The computer-implemented method of any of claims 1-5, wherein (1) the method further comprises detecting that the user has executed the predefined body action, and (2) directing the computer-generated avatar to execute the predefined body action in accordance with the set of parameters comprises directing the computer-generated avatar to execute the predefined body action in response to detecting that the user has executed the predefined body action.

Example 7: The computer-implemented method of any of claims 1-6, further comprising generating a digital signature of at least a portion of the body of the user based on the set of parameters associated with the muscle group and the predefined body action.

Example 8: The computer-implemented method of claim 7, wherein directing the computer-generated avatar that represents the user to execute the predefined body action in accordance with the set of parameters associated with the muscle group comprises directing the computer-generated avatar that represents the user to execute the predefined body action in accordance with the digital signature of the portion of the body of the user.

Example 9: The computer-implemented method of any of claims 1-8, wherein the computer-generated avatar that represents the user comprises at least one of (1) an augmented reality avatar presented within an augmented reality environment, (2) a virtual reality avatar presented within a virtual reality environment, or (3) a video conferencing avatar presented within a video conferencing application.

Example 10: The computer-implemented method of any of claims 1-9, wherein associating the feature of the body of the user with the muscle group based on the predefined body action and the set of images comprises analyzing the set of images in accordance with a machine learning model trained to associate muscle groups with features of users' bodies based on images of users executing the predefined body action.

Example 11: A system comprising (1) an identifying module, stored in memory, that identifies a muscle group engaged by a user to execute a predefined body action by (i) capturing a set of images of the user while the user executes the predefined body action, (ii) associating a feature of a body of the user with the muscle group based on the predefined body action and the set of images, (2) a determining module, stored in memory, that determines, based on the set of images, a set of parameters associated with the user, the muscle group, and the predefined body action, the set of parameters comprising (i) an onset curve associated with the muscle group and execution of the predefined body action, and (ii) a falloff curve associated with the muscle group and execution of the predefined body action, and (3) a directing module, stored in memory, that directs a computer-generated avatar that represents the body of the user to produce the predefined body action in accordance with the set of parameters.

Example 12: The system of claim 11, wherein (1) the onset curve describes a rate of change over time of an intensity level of the muscle group as the user executes the predefined body action, and (2) the falloff curve describes a rate of change over time of the intensity level of the muscle group subsequent to the user executing the predefined body action.

Example 13: The system of claim 12, wherein (1) the set of parameters further comprises (i) a target intensity level associated with the predefined body action, and (ii) a source intensity level associated with a previous predefined body action, (2) the onset curve describes a rate of change over time of the intensity level of the muscle group from the source intensity level to the target intensity level, and (3) the falloff curve describes a rate of change over time of the intensity level of the muscle group from the target intensity level to an additional intensity level.

Example 14: The system of any of claims 11-13, wherein (1) the identifying module further identifies an additional set of muscle groups, each muscle group in the additional set of muscle groups engaged by the user to produce an additional predefined body action, (2) for each muscle group in the additional set of muscle groups, the determining module further determines (i) an additional onset curve that describes a change of the muscle group over time to produce the additional predefined body action, and (ii) an additional falloff curve that describes a change of the muscle group over time subsequent to producing the additional predefined body action, (3) the directing module further (i) detects the user executing the additional predefined body action subsequent to the user executing the predefined body action, and (ii) transitions the computer-generated avatar from executing the predefined body action to executing the additional predefined body action in accordance with the falloff curve and the additional onset curve in response to detecting the user executing the additional predefined body action subsequent to the user executing the predefined body action.

Example 15: The system of claim 14, wherein (i) the set of parameters further comprises a peak transition velocity of the muscle group, and (ii) the directing module transitions the computer-generated avatar from executing the predefined body action to producing the additional predefined body action by transitioning the computer-generated avatar from executing the predefined body action to producing the additional predefined body action such that a transition velocity of a portion of the computer-generated avatar that corresponds to the muscle group remains below the peak transition velocity of the muscle group during the transition.

Example 16: The system of any of claims 11-15, wherein (i) the system further comprises a detecting module, stored in memory, that detects that the user has executed the predefined body action, (ii) the directing module directs the computer-generated avatar to execute the predefined body action in accordance with the set of parameters by directing the computer-generated avatar to execute the predefined body action in response to the detecting module detecting that the user has executed the predefined body action.

Example 17: The system of any of claims 11-16, wherein the determining module further determines the set of parameters associated with the user, the muscle group, and the predefined body action by generating a digital signature of at least a portion of the body of the user based on the set of parameters associated with the muscle group and the predefined body action.

Example 18: The system of claim 17, wherein the directing module directs the computer-generated avatar that represents the user to execute the predefined body action in accordance with the set of parameters associated with the muscle group by directing the computer-generated avatar that represents the user to execute the predefined body action in accordance with the digital signature of the portion of the body of the user.

Example 19: The system of any of claims 11-18, wherein the determining module associates the feature of the body of the user with the muscle group based on the predefined body action and the set of images by analyzing the set of images in accordance with a machine learning model trained to associate muscle groups with features of users' bodies based on images of users executing the predefined body action.

Example 20: A non-transitory computer-readable medium comprising computer-readable instructions that, when executed by at least one processor of a computing system, cause the computing system to (1) identify a muscle group engaged by a user to execute a predefined body action by (i) capturing a set of images of the user while the user executes the predefined body action, and (ii) associating a feature of a body of the user with the muscle group based on the predefined body action and the set of images, (2) determine, based on the set of images, a set of parameters associated with the user, the muscle group, and the predefined body action, the set of parameters comprising (i) an onset curve associated with the muscle group and execution of the predefined body action, and (ii) a falloff curve associated with the muscle group and execution of the predefined body action, and (3) direct a computer-generated avatar that represents the body of the user to produce the predefined body action in accordance with the set of parameters.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data associated with a face of a user (e.g., face data 144) to be transformed, transform the data associated with the face, output a result of the transformation to identify a set of AUs associated with the face, use the result of the transformation to determine, for each AU in the set of AUs, a set of AU parameters, and store the result of the transformation to direct a computer-generated avatar to produce a viseme in accordance with the set of AU parameters associated with each AU. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying a muscle group engaged by a user to execute a predefined body action by:
        capturing a set of images of the user while the user executes the predefined body action; and
        associating a feature of a body of the user with the muscle group based on the predefined body action and the set of images;
    training an artificial neural network to determine parameters associated with the user, the muscle group, and the predefined body action, the parameters comprising:
        an onset curve that describes a rate of change over time of an intensity level of the muscle group as the user executes the predefined body action; and
        a falloff curve that describes a rate of change over time of an intensity level of the muscle group subsequent to the user executing the predefined body action;
    determining, by providing the set of images as input to the trained artificial neural network, a set of parameters comprising:
        an onset curve corresponding to the user, the muscle group, and the predefined body action; and
        a falloff curve corresponding to the user, the muscle group, and the predefined body action; and
    directing a computer-generated avatar that represents the body of the user to produce the predefined body action in accordance with the set of parameters.

2. The computer-implemented method of claim 1, wherein:
    the set of parameters further comprises:
        a target intensity level associated with the predefined body action; and
        a source intensity level associated with a previous predefined body action;
    the onset curve describes a rate of change over time of the intensity level of the muscle group from the source intensity level to the target intensity level; and
    the falloff curve describes a rate of change over time of the intensity level of the muscle group from the target intensity level to an additional intensity level.

3. The computer-implemented method of claim 1, further comprising:
    identifying an additional set of muscle groups, each muscle group in the additional set of muscle groups engaged by the user to produce an additional predefined body action;
    for each muscle group in the additional set of muscle groups, determining:
        an additional onset curve that describes a change of the muscle group over time to produce the additional predefined body action; and
        an additional falloff curve that describes a change of the muscle group over time subsequent to producing the additional predefined body action;
    detecting the user executing the additional predefined body action subsequent to the user executing the predefined body action; and
    transitioning the computer-generated avatar from executing the predefined body action to executing the additional predefined body action in accordance with the falloff curve and the additional onset curve in response to detecting the user executing the additional predefined body action subsequent to the user executing the predefined body action.

4. The computer-implemented method of claim 3, wherein:
    the set of parameters further comprises a peak transition velocity of the muscle group; and
    transitioning the computer-generated avatar from executing the predefined body action to producing the additional predefined body action comprises transitioning the computer-generated avatar from executing the predefined body action to producing the additional predefined body action such that a transition velocity of a portion of the computer-generated avatar that corresponds to the muscle group remains below the peak transition velocity of the muscle group during the transition.

5. The computer-implemented method of claim 1, wherein:
the method further comprises detecting that the user has executed the predefined body action; and
directing the computer-generated avatar to execute the predefined body action in accordance with the set of parameters comprises directing the computer-generated avatar to execute the predefined body action in response to detecting that the user has executed the predefined body action.

6. The computer-implemented method of claim 1, further comprising generating a digital signature of at least a portion of the body of the user based on the set of parameters associated with the muscle group and the predefined body action.

7. The computer-implemented method of claim 6, wherein directing the computer-generated avatar that represents the user to execute the predefined body action in accordance with the set of parameters associated with the muscle group comprises directing the computer-generated avatar that represents the user to execute the predefined body action in accordance with the digital signature of the portion of the body of the user.

8. The computer-implemented method of claim 1, wherein the computer-generated avatar that represents the user comprises at least one of:
an augmented reality avatar presented within an augmented reality environment;
a virtual reality avatar presented within a virtual reality environment; or
a video conferencing avatar presented within a video conferencing application.

9. The computer-implemented method of claim 1, wherein associating the feature of the body of the user with the muscle group based on the predefined body action and the set of images comprises analyzing the set of images in accordance with a convolutional neural network pre-trained to associate muscle groups with features of users' bodies based on images of users executing the predefined body action.

10. The computer-implemented method of claim 1, wherein:
the method further comprises training the artificial neural network to associate muscle groups with features of users' bodies based on images of users executing the predefined body action; and
identifying the muscle group further comprises providing the artificial neural network with the set of images of the user.

11. A system comprising:
an identifying module, stored in memory, that identifies a muscle group engaged by a user to execute a predefined body action by:
capturing a set of images of the user while the user executes the predefined body action; and
associating a feature of a body of the user with the muscle group based on the predefined body action and the set of images;
a determining module, stored in memory, that:
trains an artificial neural network to determine parameters associated with the user, the muscle group, and the predefined body action, the parameters comprising:
an onset curve that describes a rate of change over time of an intensity level of the muscle group as the user executes the predefined body action; and
a falloff curve that describes a rate of change over time of an intensity level of the muscle group subsequent to the user executing the predefined body action; and
determines, by providing the set of images as input to the trained artificial neural network, a set of parameters comprising:
an onset curve corresponding to the user, the muscle group, and the predefined body action; and
a falloff curve corresponding to the user, the muscle group, and the predefined body action;
a directing module, stored in memory, that directs a computer-generated avatar that represents the body of the user to produce the predefined body action in accordance with the set of parameters; and
at least one physical processor that executes the identifying module, the determining module, and the directing module.

12. The system of claim 11, wherein:
the set of parameters further comprises:
a target intensity level associated with the predefined body action; and
a source intensity level associated with a previous predefined body action;
the onset curve describes a rate of change over time of the intensity level of the muscle group from the source intensity level to the target intensity level; and
the falloff curve describes a rate of change over time of the intensity level of the muscle group from the target intensity level to an additional intensity level.

13. The system of claim 11, wherein:
the identifying module further identifies an additional set of muscle groups, each muscle group in the additional set of muscle groups engaged by the user to produce an additional predefined body action;
for each muscle group in the additional set of muscle groups, the determining module further determines:
an additional onset curve that describes a change of the muscle group over time to produce the additional predefined body action; and
an additional falloff curve that describes a change of the muscle group over time subsequent to producing the additional predefined body action;
the directing module further:
detects the user executing the additional predefined body action subsequent to the user executing the predefined body action; and
transitions the computer-generated avatar from executing the predefined body action to executing the additional predefined body action in accordance with the falloff curve and the additional onset curve in response to detecting the user executing the additional predefined body action subsequent to the user executing the predefined body action.

14. The system of claim 13, wherein:
the set of parameters further comprises a peak transition velocity of the muscle group; and
the directing module transitions the computer-generated avatar from executing the predefined body action to producing the additional predefined body action by transitioning the computer-generated avatar from executing the predefined body action to producing the additional predefined body action such that a transition velocity of a portion of the computer-generated avatar that corresponds to the muscle group remains below the peak transition velocity of the muscle group during the transition.

15. The system of claim 11, wherein:
- the system further comprises a detecting module, stored in memory, that detects that the user has executed the predefined body action;
- the physical processor further executes the detecting module; and
- the directing module directs the computer-generated avatar to execute the predefined body action in accordance with the set of parameters by directing the computer-generated avatar to execute the predefined body action in response to the detecting module detecting that the user has executed the predefined body action.

16. The system of claim 11, wherein the determining module further determines the set of parameters associated with the user, the muscle group, and the predefined body action by generating a digital signature of at least a portion of the body of the user based on the set of parameters associated with the muscle group and the predefined body action.

17. The system of claim 16, wherein the directing module directs the computer-generated avatar that represents the user to execute the predefined body action in accordance with the set of parameters associated with the muscle group by directing the computer-generated avatar that represents the user to execute the predefined body action in accordance with the digital signature of the portion of the body of the user.

18. The system of claim 11, wherein the determining module associates the feature of the body of the user with the muscle group based on the predefined body action and the set of images by analyzing the set of images in accordance with a convolutional neural network pre-trained to associate muscle groups with features of users' bodies based on images of users executing the predefined body action.

19. The system of claim 11, wherein:
- the determining module further trains the artificial neural network to associate muscle groups with features of users' bodies based on images of users executing the predefined body action; and
- the identifying module further identifies the muscle group by providing the artificial neural network with the set of images of the user.

20. A non-transitory computer-readable medium comprising computer-readable instructions that, when executed by at least one processor of a computing system, cause the computing system to:
- identify a muscle group engaged by a user to execute a predefined body action by:
  - capturing a set of images of the user while the user executes the predefined body action; and
  - associating a feature of a body of the user with the muscle group based on the predefined body action and the set of images;
- train an artificial neural network to determine parameters associated with the user, the muscle group, and the predefined body action, the parameters comprising:
  - an onset curve that describes a rate of change over time of an intensity level of the muscle group as the user executes the predefined body action; and
  - a falloff curve that describes a rate of change over time of an intensity level of the muscle group subsequent to the user executing the predefined body action;
- determine, by providing the set of images as input to the trained artificial neural network, a set of parameters comprising:
  - an onset curve corresponding to the user, the muscle group, and the predefined body action; and
  - a falloff curve corresponding to the user, the muscle group, and the predefined body action; and
- direct a computer-generated avatar that represents the body of the user to produce the predefined body action in accordance with the set of parameters.

* * * * *